(12) United States Patent
Kono et al.

(10) Patent No.: US 7,390,127 B2
(45) Date of Patent: Jun. 24, 2008

(54) ROLLER BEARING ASSEMBLY

(75) Inventors: Shingo Kono, Iwata (JP); Kousuke Obayashi, Iwata (JP); Hideki Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 292 days.

(21) Appl. No.: 11/271,953

(22) Filed: Nov. 14, 2005

(65) Prior Publication Data

US 2006/0104560 A1 May 18, 2006

(30) Foreign Application Priority Data

Nov. 17, 2004 (JP) ............................. 2004-332612

(51) Int. Cl.
  *F16C 33/46* (2006.01)
  *F16C 33/48* (2006.01)
  *F16C 33/44* (2006.01)

(52) U.S. Cl. ..................... 384/572; 384/577; 384/526; 384/527

(58) Field of Classification Search ......... 384/572–580, 384/526, 530, 531, 909, 911; 29/898.067
  See application file for complete search history.

(56) References Cited

U.S. PATENT DOCUMENTS

| | | | | |
|---|---|---|---|---|
| 1,426,578 A | * | 8/1922 | Lott | 384/577 |
| 1,894,595 A | * | 1/1933 | Mitchel | 384/577 |
| 2,540,283 A | * | 2/1951 | Parsons | 384/578 |
| 3,477,773 A | * | 11/1969 | Altson | 384/576 |
| 4,277,116 A | * | 7/1981 | Lauterbach | 384/530 |
| 4,541,743 A | * | 9/1985 | Hatano | 384/572 |
| 5,000,303 A | * | 3/1991 | Shoji et al. | 192/45.1 |
| 5,957,592 A | * | 9/1999 | Yamanaka | 384/526 |
| 6,102,579 A | * | 8/2000 | Kupietz | 384/572 |
| 6,179,474 B1 | * | 1/2001 | Podhajecki | 384/573 |
| 6,315,456 B1 | * | 11/2001 | Tanimoto et al. | 384/527 |
| 6,857,785 B2 | * | 2/2005 | Takahashi et al. | 384/572 |
| 2002/0141678 A1 | * | 10/2002 | Takahashi et al. | 384/572 |

FOREIGN PATENT DOCUMENTS

| | | | |
|---|---|---|---|
| JP | 58102824 A | * | 6/1983 |
| JP | 11344029 A | * | 12/1999 |
| JP | 2000-179544 | | 6/2000 |
| JP | 2003-166540 | | 6/2003 |
| JP | 2005-249163 | | 9/2005 |

* cited by examiner

*Primary Examiner*—Marcus Charles

(57) ABSTRACT

To provide a roller bearing assembly that can provide a high load bearing capacity and in which the strength of roller retainers can be increased, the roller bearing assembly includes inner and outer roller retainers (13, 23) each having a plurality of circumferentially arranged pockets (4), and a circular row of rollers (2) received in part within the pockets in the inner roller (13) and in part within the pockets in the outer roller (23). The inner roller retainer (13) has pillars (5) each left between the neighboring pockets to retain the circular row of the rollers from radially inwardly and having an outer diameter smaller than the diameter of the pitch circle PCD of the circular row of the rollers. The outer roller retainer (23) has pillars (5) each left between the neighboring pockets to retain the circular row of the rollers from radially outwardly and having an inner diameter greater than the pitch circle diameter PCD. One of the outer and inner roller retainers is made of a metallic material while the other thereof is made of a resinous material.

25 Claims, 14 Drawing Sheets

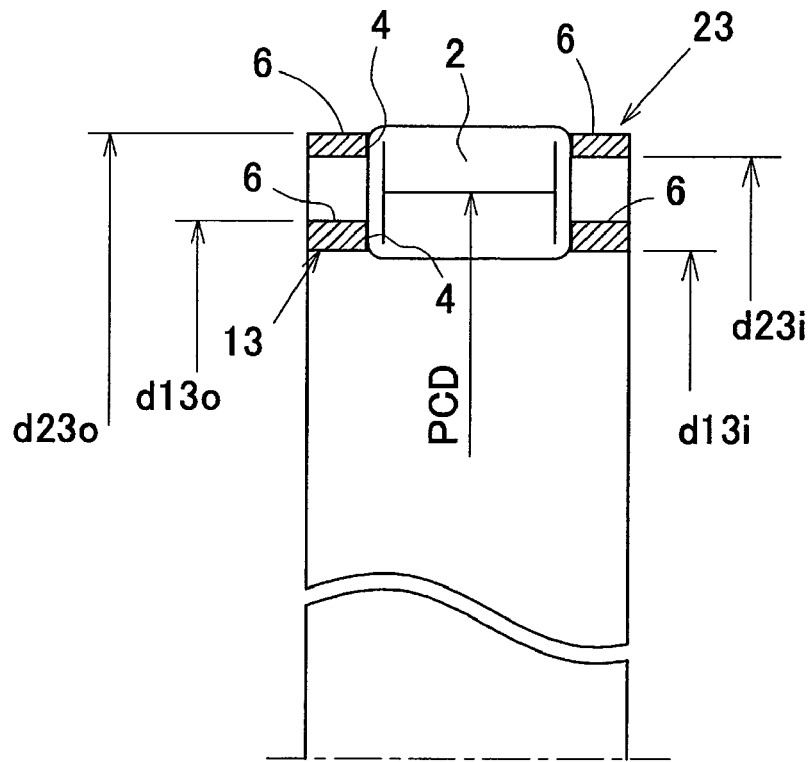
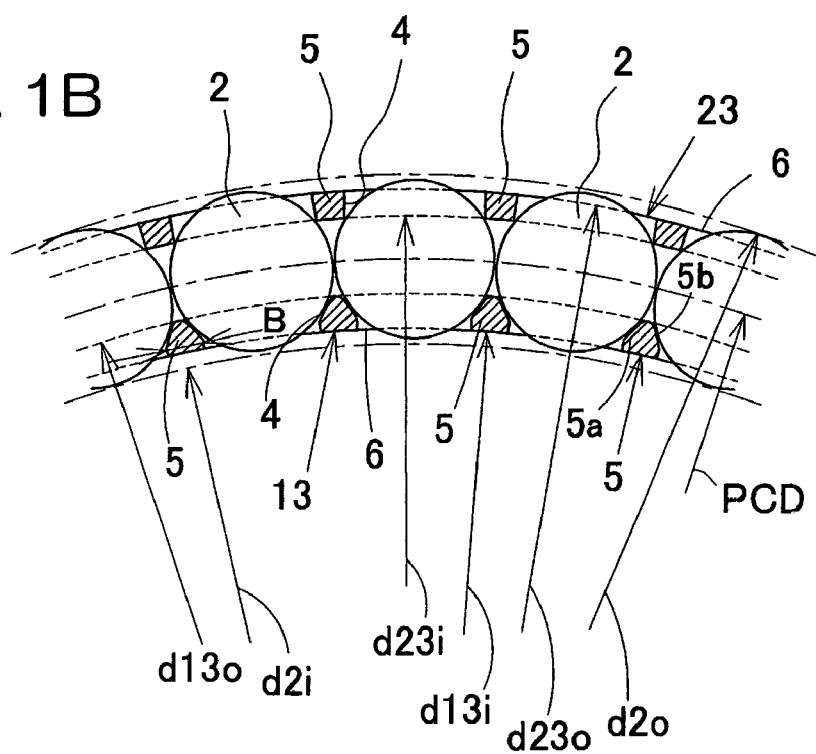

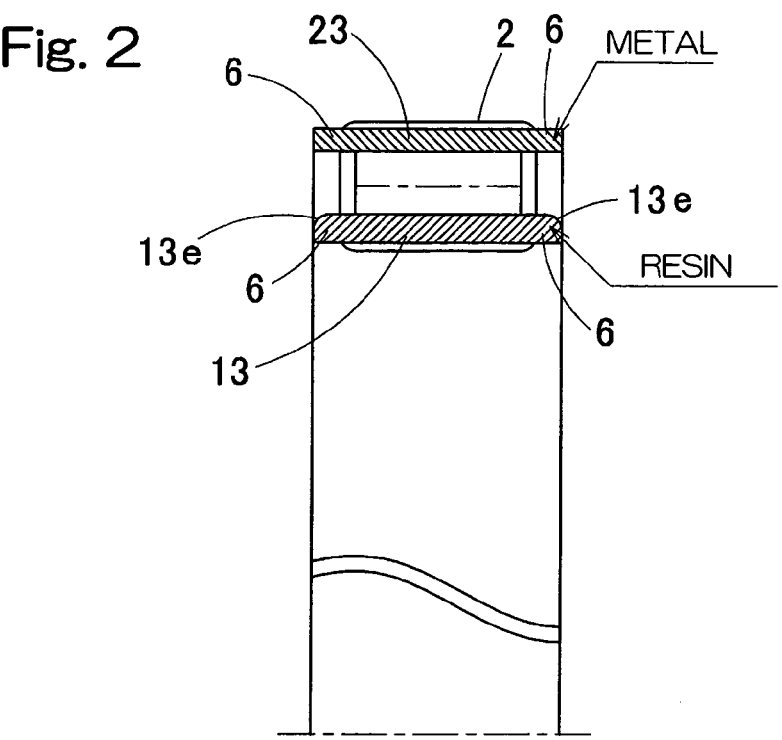
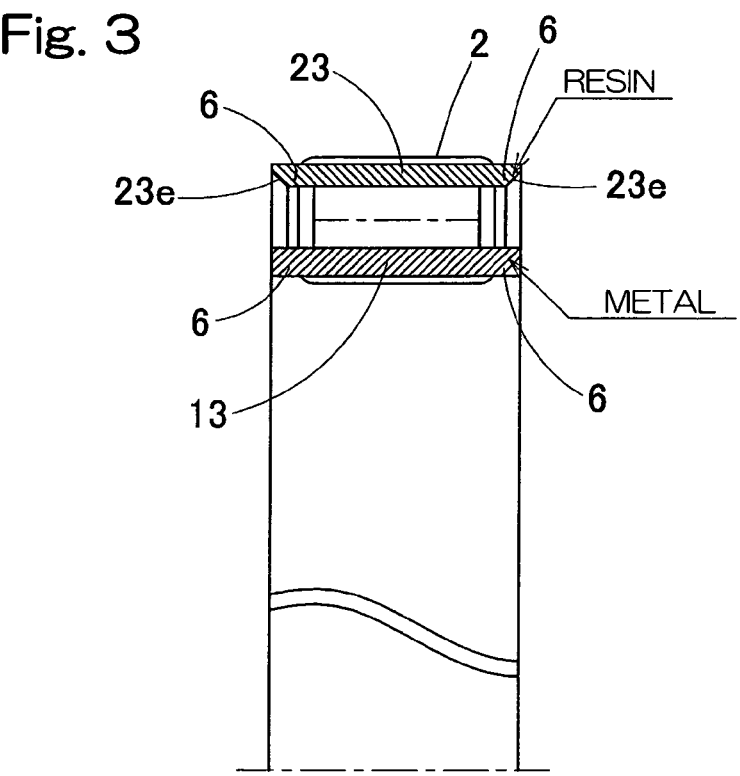

Fig. 11A
Fig. 11B
Fig. 11C
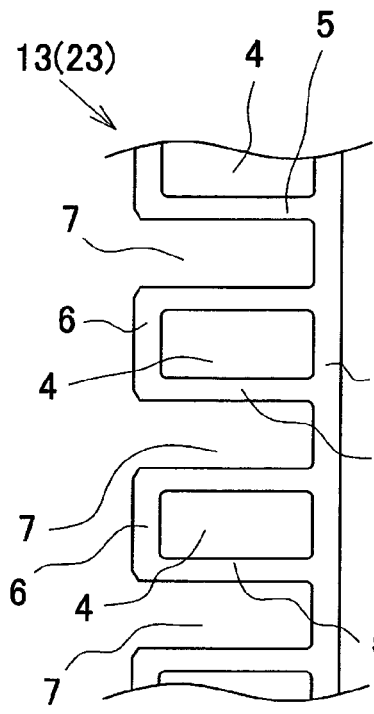
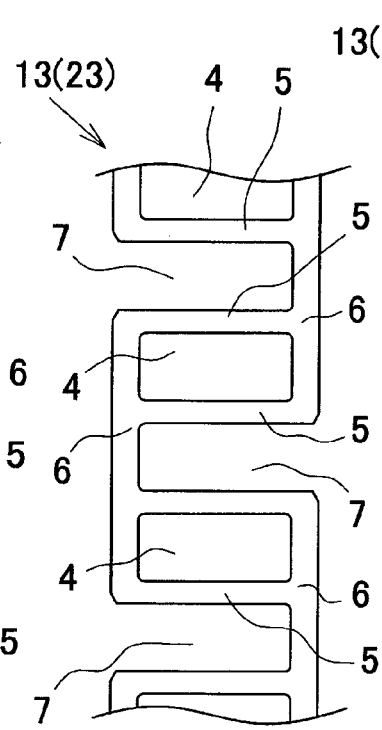
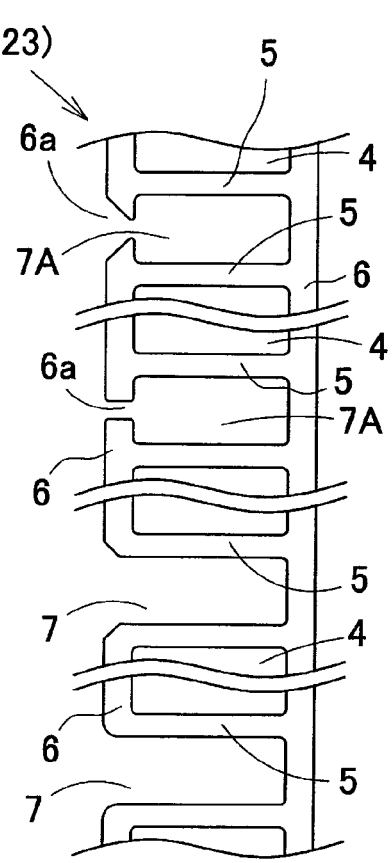
Fig. 11D
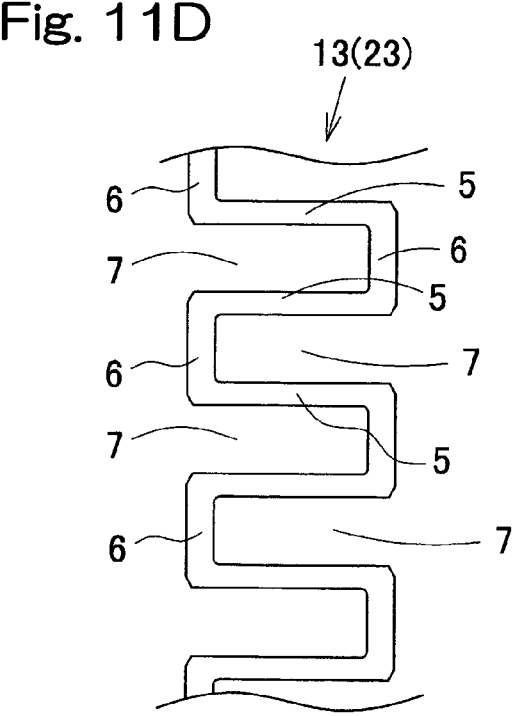

ROLLER BEARING ASSEMBLY

BACKGROUND OF THE INVENTION

1. Field of the Invention

The present invention relates to a roller bearing assembly that can be applied where a large load bearing capacity is required within a limited space, such as including a bearing assembly for supporting big and small ends of a connecting rod in an engine, a bearing assembly for a transmission, a bearing assembly for use in car air conditioners, a bearing assembly for use with a seat reclining mechanism and a bearing assembly for use in reduction gear units.

2. Description of the Prior Art

The roller bearing assembly has hitherto been well known, of a type in which neither an inner race nor an outer race is employed and a row of rolling elements are held in direct contact with inner and outer peripheral surfaces of operating elements of a device or equipment. This type of roller bearing assembly is generally referred to as a roller and retainer assembly or a caged roller assembly. In order to avoid accidental separation of some or all of the rollers from the roller retainer prior to the roller bearing assembly incorporated in a machine or equipment, the roller retainer used in this roller and retainer assembly hitherto largely employed has a generally M-shaped cross section, including an inner annular member of a diameter smaller than the diameter of the pitch circle of the rollers and an outer annular member of a diameter greater than the pitch circle diameter.

However, the M-sectioned roller retainer has pillars that lie on the pitch circle where the neighboring rollers are positioned closest to each other and, therefore, an attempt to increase of the number of rollers that can be accommodated within a limited space requires reduction of the circumferential width of each of the pillars left between the neighboring pockets. Accordingly, not only is the machining limit of the roller retainer encountered with, but the strength of the roller retainer tends to decrease.

In order to alleviate the foregoing problems, the roller and retainer assembly has been suggested, in which outer and inner annular members are positioned radially outwardly and inwardly of the pitch circle, respectively. See, for example, Japanese Laid-open Patent Publication No. 2000-179544. According to this known roller and retainer assembly, since no pillar of the retainer lie on the pitch circle where the neighboring rollers are positioned closest to each other, the pitch between the neighboring rollers can be reduced to permit an increase of the number of the rollers that can be accommodated in the retainer and this is indeed in contrast to the conventional roller retainer of the M-shaped section discussed above.

As an improved version of the roller retainer disclosed in the above mentioned Japanese patent document, the retainer has been suggested, in which a single split region is provided in the inner member at a location circumferentially thereof, so that the assemblability of the inner member can be increased. See, for example, the Japanese Laid-open Patent Publication No. 2003-166540.

On the other hand, Japanese Laid-open Patent Publication No. 2005-249163, filed in the name of the assignee of the present invention, discloses the roller and retainer assembly which includes a roller retainer made up of inner and outer members, each made of a resinous material, and having a plurality of circumferentially spaced slits each being of a shape cut-in inwardly from one side edge towards the opposite side edge.

The roller and retainer assembly disclosed in the first mentioned Japanese patent document includes an outer member and an inner member, in which the pillar between the neighboring pockets defined in the outer retainer has a rectangular cross-sectional shape. Accordingly, when an attempt is made to reduce the pitch between the neighboring rollers to render the resultant roller and retainer assembly to have an increased load bearing capacity, the plate thickness cannot be increased with no decrease of the strength, rendering the strength of the retainer to be low.

On the other hand, the roller and retainer assembly disclosed in the second mentioned Japanese patent document, that is, of the structure in which the split region is employed in the inner member at a location circumferentially thereof, a problem tends to arise that when the retainer is made of a resinous material, no injection molding process cannot be employed, making it difficult to manufacture. In other words, the presence of the split region at the location circumferentially of the inner member render the roundness of the retainer to be degraded and, therefore, no injection molding process can be employed. For this reason, the inner member is generally manufactured by injection molding in a ring member having no split region, which is subsequently formed with a split region by means of a mechanical cutting process. Thus, the necessity of the mechanical cutting process increases the number of manufacturing process steps, resulting in increase of the cost of manufacture.

Also, opposite ends of the inner member on respective sides of the split region must be overlapped one above the other to render the inner member to have a size smaller than the diameter of the inscribed circle of the roller. Thereafter, the split region is engaged to restore the inner member to the original diameter. For this reason, no assembly can be achieved relying only on the elasticity possessed by the material of the retainer, resulting in low assemblability.

SUMMARY OF THE INVENTION

In view of the foregoing, the present invention is intended to provide a roller bearing assembly that can be applied where a large load bearing capacity is required within a limited space.

Another important object of the present invention is to increase the assemblability of the roller bearing assembly.

In order to accomplish the foregoing objects of the present invention, the present invention provides a roller bearing assembly which includes a ring-shaped inner roller retainer having a plurality of pockets defined therein and arranged in a direction circumferentially thereof and also having pillars each left between the neighboring pockets of the inner roller retainer, a ring-shaped outer roller retainer having a plurality of pockets defined therein and arranged in a direction circumferentially thereof and also having pillars each left between the neighboring pockets of the outer roller retainer, and a corresponding number of rollers rollingly retained in part within the pockets of the inner roller retainer and in part within the pockets of the outer roller retainer. The pillars of the inner roller retainer retain the rollers from radially inwardly and have an outer diameter smaller than a diameter of a pitch circle of the rollers, whereas the pillars of the outer roller retainer retain the rollers from radially outwardly and have an inner diameter greater than the diameter of the pitch circle of the rollers. One of the inner and outer roller retainers is made of a metallic material and the other of the inner and outer roller retainers is made of a resinous material.

According to the foregoing construction, since the two roller retainers, that is, the inner and outer roller retainers are employed, despite the fact that the roller assembly of the present invention is a retainer-equipped roller bearing assembly having no raceway member, it can be rendered to be a non-detachable roller bearing assembly in which some or all of the rollers will not fall or drop out prior to the roller bearing assembly being incorporated in a machine or equipment. In such case, since the pillars of the inner and outer roller retainers serve to retain the rollers from radially inwardly and radially outwardly, respectively, with the outer diameter of the pillars of the inner roller retainer chosen to be smaller than the diameter of the pitch circle of the circular row of the rollers and also with the inner diameter of the pillars of the outer roller retainer chosen to be greater than the diameter of the pitch circle of the circular row of the rollers, it is possible to avoid positioning of the rollers on the pitch circle depicted by the circular row of the rollers. For this reason, the presence of the pillar does not lead to an increase of the space between the neighboring rollers and, despite of the fact that the roller bearing assembly of the present invention is rendered to be of a non-detachable type having the roller retainers, the roller bearing assembly of the present invention can have the roller in a number nearly equal to that of the rollers used in the full complement type roller bearing, and, as compared with the conventional roller bearing assembly of a type having an outer race and having the same sectional height, a larger load bearing capacity can be exhibited. For this reason, during the assemblage of the bearing assembly, the assemblage can be accomplished with a minimized number of process steps with no need to use any sleeve for the prevention of fall or drop of the rollers, thus eliminating the various problems inherent in the full complement type roller assembly.

Also, since one of the outer and inner roller retainers is made of the metallic material, as compared with the outer and inner roller retainers being made of the resinous material, the roller retainer can have a greater strength. Also, since the other of the outer and inner roller retainers is made of the resinous material, and since the roller retainer made of the resinous material can have an elasticity to a certain extent even though such one of the roller retainers is made of the metallic material, the rollers can easily be incorporated by the utilization of an elastic deformation thereof.

Where the outer roller retainer is made of the metallic material and the inner roller retainer is made of the resinous material, a slit of a shape cut-in from one side edge of the inner roller retainer towards the opposite side edge thereof is provided at a plurality of circumferential locations of the inner roller retainer made of the resinous material.

Alternatively, where the outer roller is made of the resinous material and the inner roller retainer is made of the metallic material, a slit of a shape cut-in from one side edge of the outer roller retainer towards the opposite side edge thereof is provided at a plurality of circumferential locations of the outer roller retainer made of the resinous material.

Where as described above the slit of a shape cut-in from one side edge of the roller retainer made of the resinous material towards the opposite side edge thereof is provided at the plural circumferential locations of the roller retainer made of the resinous material, a diametric expansion or a diametric constriction of the roller retainer made of the resinous material can easily be achieved during assemblage of the roller bearing assembly and the roller retainer can easily be inserted into radially inwardly or radially outwardly of the circular row of the rollers.

The slit referred to above may concurrently serve as a pocket for receiving the corresponding roller. In other words, a portion of a ring-shaped end on one side edge of the roller retainer is depleted at a location of the corresponding pocket so that that depleted portion and the pocket can cooperate together to define the slit.

Positioning of the rollers also within the slits results in increase of the number of the rollers employed to thereby increase the load bearing capacity of the roller bearing assembly enormously even though the slits are employed.

The slit may be provided only in an end face at one side of the roller retainer. Alternatively, the slit is provided in end faces on opposite sides of the roller retainer. In either case, respective positions of the slits in the circumferential direction may be equidistantly or non-equidistantly spaced from each other. In particular, where the slits are provided in end faces on opposite sides of the roller retainer, the slits may be alternately or non-alternately arranged relative to each other.

When the slit of a shape cut-in inwardly from one side edge towards the opposite side edge of the inner roller retainer is provided at the plural locations in the circumferential direction of such inner roller retainer as hereinabove described, the circumferential width of each of the slits and the number of the slits in the roller retainer may be so chosen that a ring body assumed when arcuate circumferential portions, excluding the slits, are connected together, may have an outer diameter that is smaller than a diameter of a circle inscribed by a circular row of the rollers.

By properly setting the circumferential width of each of the slits and the number of the slits in the roller retainer in the manner described above, after the rollers have been arranged at a predetermined position in the outer roller retainer, a job of inserting the roller retainer inside of the circular row of the rollers with open ends of the slits oriented towards the circular row of the rollers can easily accomplished by diametrically constricting a leading or inserting side of the roller retainer, resulting in increase of the assemblability.

In the present invention, a radially outer or inner edge portion of the roller retainer made of the resinous material may be tapered axially outwardly or so shaped as to represent an axially outwardly constricted edge portion. Where at this time the inner roller retainer is made of the resinous material, the radially outer edge portion of the roller retainer is so shaped as to represent the axially outwardly constricted edge portion, but where the outer roller retainer is made of the resinous material, the radially inner edge portion of the roller retainer is so shaped as to represent the axially outwardly constricted edge portion.

By so shaping as to represent the axially outwardly constricted edge portion, insertion of the roller retainer inside the circular row of the rollers during assemblage can further smoothly be accomplished, resulting in further increase of the assemblability.

In the present invention, each of the pillars of the inner roller retainer may have a cross-sectional shape having a radially outer portion thereof constricted in a direction radially outwardly thereof.

Also, each of the pillars of the outer roller retainer may have a rectangular cross-sectional shape or a shape having a radially inner portion thereof constricted in a direction radially inwardly thereof.

The space between the neighboring members of the circular row of the rollers represents a triangular gap decreasing on a side adjacent the pitch circle. Accordingly, if the cross-sectional shape of the pillars represents a shape tapered or arcuated to constrict in a direction radially towards the pitch circle, the cross-sectional area of each pillar can be increased without the space between the neighboring rollers increased. In other words, in the case of the pillars of the inner roller retainer, the radially outer portion thereof is constricted in a direction radially outwardly thereof, and in the case of the pillars of the outer roller retainer, the radially inner portion thereof is constricted in a direction radially inwardly thereof, so that the cross-sectional area of each pillar can be increased accompanied by increase of the strength. However, with respect to a portion where each pillar attains the largest width, no increase is made along the surface of each roller, but a substantially constant circumferential width is employed to allow a gap between the roller surface and the pillar surface to be increased to thereby avoid an obstruction to the flow of a lubricant oil to thereby avoid an undesirable reduction in lubricity. Selection of the rectangular cross-sectional shape for each of the pillars of the outer roller retainer makes it possible to facilitate the use of a welded roller retainer made of the metallic material.

In the present invention, the inner roller retainer may have an inner diameter greater by 0.1 mm or more than a diameter of an inscribed circle of a circular row of the rollers. With this structure the roller retainer does not strongly contact a shaft with which the rollers rollingly contact outwardly and, therefore, the roller retainer is effective to avoid an increase of the frictional torque of the shaft.

With respect to the outer diameter of the outer roller retainer, it may be smaller by 0.1 mm or more than a diameter of a circumscribed circle of a circular row of the rollers. With this structure the roller retainer does not strongly contact an inner peripheral surface of a machine or equipment with which the rollers rollingly contact and, therefore, the roller retainer is effective to avoid an increase of the frictional torque.

In the present invention, respective corners of the pillars of the roller retainer made of the metallic material are provided with plastically worked portions of a chamfered shape. This plastic working is referred to as a surface-press or the like.

If the corners of the pillars, which confront the rollers, are formed to represent the chamfered shape, the plate thickness of the metallic roller retainer can be increased by a quantity corresponding to the amount by which the chamfered portion can penetrate into the space between the neighboring rollers, resulting in the increase of the strength of the retainer. Also, if a process to form the chamfered shape is a plastic working process, it can be simply processed as compared with a mechanical process such as a grinding and there is no problem of generation of grinding scraps.

In the present invention, the roller retainer made of the metallic material may be formed by curling a metal strip in a ring shape with its opposite ends welded together. If the metallic roller retainer is formed by curling a metal strip with its opposite ends welded together, the manufacture is simple.

The metallic roller retainer referred to above may be manufactured by means of a grinding process. The grinding is advantageous in that the roller retainer can be manufactured precisely.

Alternatively, the metallic roller retainer referred to above may be manufactured by means of a press work. The press work is advantageous in that an excellent productivity of the roller retainer can be obtained.

In the present invention, the roller retainer made of the resinous material may be formed by means of an injection molding process. The use of the injection molding process results in a high productivity.

The roller retainer made of the resinous material may also be manufactured by means of a grinding process. The use of the grinding process makes it possible to provide any complicated shape.

In the present invention, the number of the roller may be equal to or smaller by one or two than that of rollers used in a full complement type roller assembly. With this structure, despite of the fact that the roller assembly of the present invention is of the non-detachable type using the roller retainers, the number of the rollers used therein can be made about equal to that of the rollers used in the full complement type roller bearing. Accordingly, it is possible to secure a large load bearing capacity of the roller assembly.

A first method of assembling a roller bearing assembly according to the present invention is applicable to the roller bearing assembly of a type, in which an inner roller retainer has slits provided only on one side thereof. This first assembling method includes arranging rollers on an inner peripheral surface of an outer roller retainer; subsequently inserting an inner roller retainer axially inwardly of a circular row of the rollers; and after the insertion, allowing the inner roller retainer to restore to an original diameter by means of an elasticity possessed by a material for the inner roller retainer. In the practice of this first assembling method, the insertion of the inner roller retainer is carried out by pushing the inner roller retainer axially inwardly of the row of the rollers by means of a pushing jig while a leading side of the inner roller retainer is radially inwardly constricted with use of an alternatively constrictable and expandable jig having an inner surface representing a conical shape. The leading side of the retainer preferably coincides with open ends of the slits to render the leading side constrictable easily.

According to this first assembling method, since while the leading side of the roller retainer is diametrically constricted by the use of the alternatively constrictable and expandable jig having an inner surface representing a conical shape, the roller retainer is pushed by means of the pushing jig, even though the roller retainer has the slits provided only on one side thereof, insertion of the roller retained inside the circular row of the rollers can easily be accomplished. Also, during this insertion, no unreasonable load acts on the roller retainer, a reduction in precision resulting from a possible deformation that takes place during the insertion can be prevented and, hence the assemblability and the precision can be increased. Also, the assemblage can be automated.

A second method of assembling a roller bearing assembly according to the present invention is applicable to the roller bearing assembly of a type, in which an inner roller retainer has slits provided on both sides thereof. This second assembling method includes arranging rollers on an inner peripheral surface of an outer roller retainer; subsequently inserting an inner roller retainer axially inwardly of a circular row of the rollers; and after the insertion, allowing the inner roller retainer to restore to an original diameter by means of an elasticity possessed by a material for the inner roller retainer. In the practice of this second assembling method, the insertion of the inner roller retainer is carried out by pushing the inner roller retainer into a guide jig having an inner peripheral surface representing a conical shape, to radially inwardly constrict a diameter of the inner roller retainer.

In the case of this second assembling method, with no need to use the alternatively constrictable and expandable jig such as, for example, a collet chuck, to allow an insertion of a pushing jig, mere insertion of the roller retainer inside the guide jig referred to above results in assemblage of the roller bearing assembly. In such case, the flexure deformation of the roller retainer is minimal and an undesirable reduction in precision resulting from the deformation can therefore be avoided, resulting in increase of the assemblability and the precision. Also, since the roller retainer has the slits on both sides thereof, the roller retainer need not be oriented in a particular direction during the insertion, allowing the assemblability to be further increased. In addition, the assemblage discussed above can be automated with a simplified structure.

A third method of assembling a roller bearing assembly according to the present invention is applicable to the roller bearing assembly of a type, in which an outer roller retainer has slits provided only on one side thereof. This third assembling method includes arranging rollers on an outer peripheral surface of an inner roller retainer; subsequently inserting an outer roller retainer axially outwardly of a circular row of the rollers; and after the insertion, allowing the outer roller retainer to restore to an original diameter by means of an elasticity possessed by a material for the outer roller retainer. In the practice of this third assembling method, the insertion of the outer roller retainer is carried out by pushing the outer roller retainer axially outwardly of the row of the rollers by means of a pushing jig while a leading side of the outer roller retainer is radially outwardly expanded with use of an alternatively constrictable and expandable jig having an outer surface representing a conical shape. The leading side of the retainer preferably coincides with open ends of the slits to render the leading side constrictable easily.

In the case of this third assembling method, since while the leading side of the roller retainer is diametrically expanded by the use of the alternatively constrictable and expandable jig having an outer surface representing a conical shape, the roller retainer is pushed by means of the pushing jig, even though the roller retainer has the slits provided only on one side thereof, insertion of the roller retained outside the circular row of the rollers can easily be accomplished. Also, during this insertion, no unreasonable load acts on the roller retainer, a reduction in precision resulting from a possible deformation that takes place during the insertion can be prevented and, hence the assemblability and the precision can be increased. Also, the assemblage can be automated.

A fourth method of assembling a roller bearing assembly according to the present invention is applicable to the roller bearing assembly of a type, in which an outer roller retainer has slits provided on both sides thereof. This fourth assembling method includes arranging rollers on an outer peripheral surface of an inner roller retainer; subsequently inserting an outer roller retainer axially outwardly of a circular row of the rollers; and after the insertion, allowing the outer roller retainer to restore to an original diameter by means of an elasticity possessed by a material for the outer roller retainer. In the practice of this fourth assembling method, the insertion of the outer roller retainer is carried out by pushing the outer roller retainer into a guide jig having an outer peripheral surface representing a conical shape, to radially outwardly expand a diameter of the outer roller retainer.

In the case of this fourth assembling method, with no need to use the alternatively constrictable and expandable jig such as, for example, a collet chuck, to allow an insertion of a pushing jig, mere insertion of the roller retainer inside the guide jig referred to above results in assemblage of the roller bearing assembly. In such case, the flexure deformation of the roller retainer is minimal and an undesirable reduction in precision resulting from the deformation can therefore be avoided, resulting in increase of the assemblability and the precision. Also, since the roller retainer has the slits on both sides thereof, the roller retainer need not be oriented in a particular direction during the insertion, allowing the assemblability to be further increased. In addition, the assemblage discussed above can be automated with a simplified structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1A is a fragmentary longitudinal sectional view of the roller bearing assembly according to a first preferred embodiment of the present invention;

FIG. 1B is a fragmentary transverse sectional view of the roller bearing assembly shown in FIG. 1A;

FIG. 2 is a fragmentary longitudinal sectional view of the roller bearing assembly according to a second preferred embodiment of the present invention;

FIG. 3 is a fragmentary longitudinal sectional view of the roller bearing assembly according to a third preferred embodiment of the present invention;

FIGS. 11A to 11D are fragmentary front elevational views showing different modifications of slits employed in any one of the eighth and ninth embodiments of the present invention, respectively;

DETAILED DESCRIPTION OF THE EMBODIMENTS

Figure 4A:
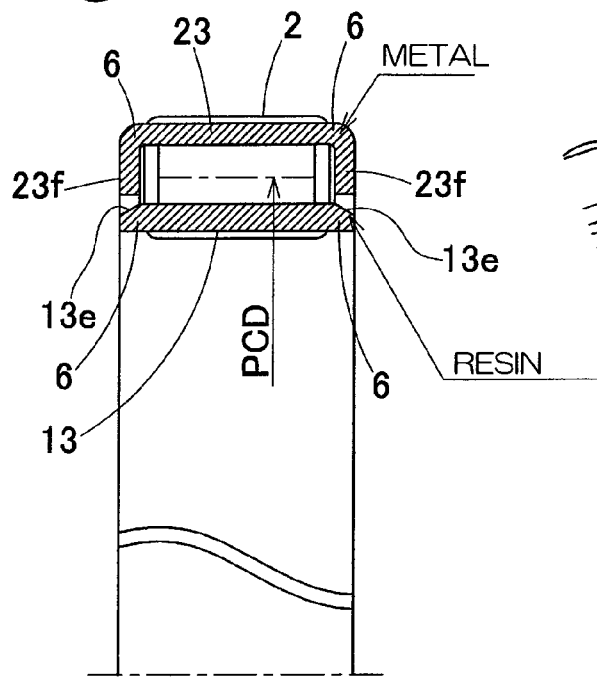
FIG. 4A is a fragmentary longitudinal sectional view of the roller bearing assembly according to a fourth preferred embodiment of the present invention.

Referring now to FIG. 1 showing a first preferred embodiment of the present invention, a roller bearing assembly shown therein includes inner and outer roller retainers 13 and 23, each having a plurality of pockets 4 defined therein, and a plurality of rollers 2 rollingly retained in part within the pockets 4 in the inner roller retainer 13 and in part within the pockets 4 in the outer roller retainer 23. Each of the inner and outer roller retainers 13 and 23 is of a ring shape having the pockets 4 defined therein so as to be arranged in a direction circumferentially thereof. The inner roller retainer 13 has pillars 5, each left between the neighboring pockets 4 and situated between the neighboring rollers 2, to retain the rollers 2 from radially inwardly. On the other hand, the outer roller retainer 23 has pillars 5, each left between the neighboring pockets 4 and situated between the neighboring rollers 2, to retain the rollers 2 from radially outwardly. The outer roller retainer 23 is made of a metallic material while the inner roller retainer 13 is made of a synthetic resin.

The outer roller retainer 23, which is a roller retainer made of a metallic material, may be of a structure that is formed by curling a metal strip in a ring shape and then welding opposite ends of the metal strip together, or manufactured by the use of any known grinding process or by the use of any known press work. This outer roller retainer 23, if a process of curling and then welding as discussed above is employed, can be manufactured easily. In the case of the use of the grinding process, the roller retainer can be manufactured with high precision. The press work is excellent in mass-producibility of the roller retainers.

The inner roller retainer 13 is made of a elastically deformable synthetic resin such as, for example, polyamide (for example, PA66 or PA46) or polyacetal. The roller retainer 13 has a strength and flexibility both appropriate to the bearing size and the bearing application and, for this purpose, the synthetic resin as a material for the roller retainer 13 is in either a non-reinforced state or a reinforced state in which a fiber reinforcement such as, for example, carbon fibers or glass fibers, is contained therein in a quantity not greater than 30%. The inner roller retainer 13, which is made of the synthetic resin, is manufactured by the use of, for example, an injection molding technique. The injection molding process is excellent in productivity. Also, this inner roller retainer 13, which is made of the synthetic resin, may be manufactured by grinding a synthetic raw material. In the case of the grinding technique, the inner roller retainer having a complicated shape can be manufactured.

Each of the inner and outer roller retainers 13 and 23 has its opposite ends in the form of a ring-shaped end 6, with the pillars 5 extending between the opposite ring-shaped ends 6 and spaced from each other in a direction circumferentially thereof. A space left between the neighboring pillars 5 forms the respective pocket 4 for receiving the corresponding roller 2.

As best shown in FIG. 1B, the inner roller retainer 13 has an inner diameter $d13i$ that is greater by 0.1 mm or more than the maximum diameter $d2i$ of the circle inscribed by the circular row of the rollers 2. The limit value 0.1 mm is irrespective of the size of the bearing assembly. The outer diameter $d13o$ of a circular array of the pillars 5 in the roller retainer 13 is chosen to be smaller than the diameter of pitch circle PCD of the circular row of the rollers 2. By way of example, the outer diameter $d13o$ is smaller by 0.1 mm or more than the pitch circle diameter PCD. The difference between the outer diameter $d13o$ and the pitch circle diameter PCD may be greater than a predetermined value that is greater than 0.1 mm and designed in consideration of the bearing size. Each of the pillars 5 in the roller retainer 13 has a width B or circumferential size within the range of 15 to 30% of the diameter of each of the rollers 2 used.

The outer roller retainer 23 has an outer diameter $d23o$ smaller by 0.1 mm or more than the minimum diameter $d2o$ of the circle circumscribed by the circular row of the rollers 2. The limit value 0.1 mm is irrespective of the size of the bearing assembly. The inner diameter $d23i$ of the circular array of the pillars 5 in the roller retainer 23 is chosen to be greater than the diameter of pitch circle diameter PCD. By way of example, the inner diameter $d23i$ is greater by 0.1 mm or more than the pitch circle diameter PCD. The difference between the inner diameter $d23i$ and the pitch circle diameter PCD may be greater than a predetermined value that is greater than 0.1 mm and designed in consideration of the bearing size.

Each of the pillars 5 of the inner roller retainer 13 has a substantially triangular sectional shape. More specifically, the cross-sectional shape of each of the pillars 5 of the inner roller retainer 13 is such that a radially innermost portion $5a$ of each pillar 5 has a substantially constant width and a portion $5b$, positioned on one side radially outwardly of the radially innermost portion $5a$ has a width progressively decreasing in a direction radially outwardly. This portion $5b$ on the side radially outwardly of the radially innermost portion $5a$ has a radially outermost tip that is, for example, squared or arcuately rounded in its entirety. Each of the pillars 5 of the outer roller retainer 23 has a cross-sectional shape which is ether square or pentagonal. Modified form of the sectional shapes of the pillars 5 of both of the inner and outer roller retainers 13 and 23 will be described later with reference to FIGS. 6 to 8.

In the roller bearing assembly of the structure described hereinabove, since the rollers 2 are retained by the inner and outer roller retainers 13 and 23, despite the fact that it is a roller bearing assembly having no raceway members, it can be rendered to be a non-detachable roller bearing assembly of a type which does not allow the rollers 2 to fall or drop out prior to the bearing assembly being incorporated in a machine or equipment. Since the inner and outer roller retainers 13 and 23 are so designed that the pillars 5 can retain the rollers 2 from radially inwardly and also from radially outwardly, the outer diameter $d13o$ of the circular array of the pillars 5 of the inner roller retainer 13 is chosen to be smaller than the pitch circle diameter PCD of the circular row of the rollers 2, and the inner diameter $d23i$ of the circular array of the pillars 5 of the outer roller retainer 23 is chosen to be greater than the pitch circle diameter PCD of the circular row of the rollers 2, it is possible to render the pillars 5 of the roller retainers 13 and 23 not to occupy respective positions on a circle of the pitch circle diameter PCD of the circular row of the rollers 2. For this reason, the presence of the pillars 5 does not increase the space between the rollers 2 and, despite the fact that the non-detachability of the rollers 2 is accomplished by the use of the roller retainers 13 and 23, the number of the rollers 2 employed can be equal to or smaller by one or two than that employed in a full complement type roller bearing, and as a result, a further large load bearing capacity can be imparted. For this reason, with no need to use a drop preventive sleeve during assemblage of the bearing assembly, the assemblage is possible with a smaller number of assembling steps, thus eliminating the various problems inherent in the full complement type roller bearings Also, since the outer roller retainer 23 is made of the metallic material, as compared with the inner and outer roller retainers 13 and 23 both made of a synthetic resin, the strength as a combination type roller retainer can increase. Since the inner roller retainer 13 is made of the synthetic resin, even though the outer roller retainer 23 is made of the metallic material, the roller retainer 13 made of the synthetic resin can have an elasticity to a certain extend and, therefore, the rollers can easily be incorporated by the utilization of the elastic deformation thereof.

Since this roller bearing assembly is of a type equipped with the retainers, the following advantages can be obtained as compared with the full complement type roller bearing.

- Even in a bearing assembly using rollers 2 each having opposite flat end faces, the rollers 2 can be rendered to be non-detachable.
- Since the rollers 2 each having the opposite flat end faces can be used, the effective length of each roller can be advantageously set to a maximum available value within the limited widthwise size.
- No limitation is imposed on selection of the lubricant such as observed with the roller bearing assembly filled with the thermal curable grease and any lubricant can be employed as desired.
- Assemblage is easier than that of the conventional non-detachable full complement roller bearing assembly.
- User's handling is easier than that of the full complement bearing assembly of a detachable type.

In the case of the roller bearing assembly according to the foregoing embodiment, the following advantages can be additionally obtained.

- Since the outer diameter d23$o$ of the outer roller retainer 23 is chosen to be smaller by 0.1 mm or more than the minimum value of the diameter d2$o$ of the circle circumscribed by the circular row of the rollers 2, a gap of 0.1 mm or more appears between a bearing box to accommodate the roller bearing assembly and the outer roller retainer 23. Because of this, the roller retainer 23 does in no way contact the bearing box strongly and, therefore, an undesirable increase of the frictional torque brought about by the outer roller retainer 23 can be avoided.
- The inner diameter d13$i$ of the inner roller retainer 13 is chosen to be greater by 0.1 mm or more than the maximum value of the diameter d2$i$ of the circle inscribed by the circular row of the rollers 2, a gap of 0.1 mm or more appears between the inner roller retainer 13 and a shaft on which the roller bearing assembly is mounted. Because of this, the inner roller retainer 13 does in no way contact the shaft strongly and, therefore, an undesirable increase of the frictional torque brought about by the inner roller retainer 13 can be avoided.

Also, since the inner diameter d23$i$ of the circular array of the pillars 5 of the outer roller retainer 23 is chosen to be greater than the pitch circle diameter PCD of the circular row of the rollers 2 by 0.1 mm or more, the space between the neighboring rollers 2 need not be increased and it is possible to avoid the lack of strength which would otherwise result from reduction in width of a radially innermost portion of each of the pillars 5 as viewed in cross-section of the pillar 5.

Moreover, since the outer diameter d13$o$ of the circular array of the pillars 5 of the inner roller retainer 13 is chosen to be smaller than the pitch circle diameter PCD of the circular row of the rollers 2 by 0.1 mm or more, the space between the neighboring rollers 2 need not be increased and it is possible to avoid the lack of strength which would otherwise result from reduction in width of the radially outermost portion of each of the pillars 5.

In addition, since each of the pillars 5 of the inner roller retainer 13 has such a sectional shape as to have radially innermost portion 5$a$ of a substantially constant width and, also, the portion 5$b$ positioned on one side radially outwardly of the radially innermost portion 5$a$ and having a width progressively decreasing in a direction radially outwardly, each of the pillars 5 can have a large radial dimension and thus an increased sectional area with no need to increase the space between the neighboring rollers 2 and, also, the lubricity is excellent. In other words, since the gap between the neighboring members of the circular row of the rollers 2 represents a generally triangular shape flaring radially inwardly of the circular row of the rollers 2, increase of the sectional area of each of the pillars 5 without the space between the neighboring rollers 2 being increased requires the respective pillar 5 to have a substantially triangular sectional shape tapering in a direction radially outwardly. However, when the radially innermost portion 5$a$ of each of the pillars 5, at which the respective pillar 5 has a maximum width, is fixed at the a substantially constant value without being expanded along surfaces of the rollers 2, with the space between the surface of the respective roller 2 and the surface of the respective pillar 5 increased, an undesirable blockage of the lubricant oil can be avoided to thereby minimize reduction of the lubricity. Also, the pillars 5 will not have any unnecessary, good-for-nothing portion and, therefore, the amount of the synthetic resin used as a material for the roller retainer 13 can advantageously be reduced.

Hereinafter, various preferred embodiments of the present invention will be described in detail with reference to FIGS. 2 to 17. It is to be noted that unless otherwise specified, those embodiments are similar to the first embodiment shown and described with reference to FIG. 1.

Referring now to FIG. 2 showing the second embodiment of the present invention, the inner roller retainer 13 made of the synthetic resin has radially outer edge portions 13$e$ which may be tapered or be so shaped as to be arcuately rounded in section to represent an axially outwardly constricted edge portion. The axially outwardly constricted edge portions are effective to facilitate a smooth insertion of the inner roller retainer 13 in a direction inwardly of the circular row of the rollers 2 during assemblage, with the assemblability further increased consequently.

In the third embodiment of the present invention shown in FIG. 3, of the inner and outer roller retainers 13 and 23, the inner roller retainer 13 is made of a metallic material and the outer roller retainer 23 is made of a synthetic resin. Even in such case, as compared with the inner and outer roller retainers 13 and 23 both made of a synthetic resin, the retainer strength as a combination type roller bearing can increase. Also, even though the inner roller retainer 13 is made of a metallic material, since the outer roller retainer 23 is made of a synthetic resin, the elastic deformation thereof can be effectively utilized to facilitate incorporation of the rollers 2.

Where the outer roller retainer 23 is made of a synthetic resin, opposite radially inner edge portions 23$e$ of this outer roller retainer 23 may be so shaped as to be arcuately rounded in section to represent an axially outwardly constricted edge portion. Thereby, in a manner similar to the embodiment shown in and described with reference to FIG. 2, a smooth insertion of the outer roller retainer 23 in a direction inwardly of the circular row of the rollers 2 can be facilitated during assemblage, with the assemblability further increased consequently.

Figure 4B:
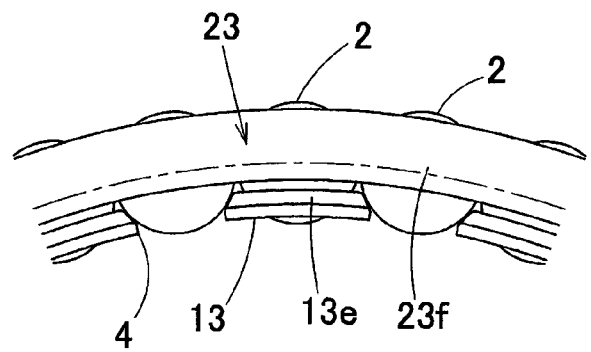
FIG. 4B is a fragmentary axial view of the roller bearing assembly shown in FIG. 4A.

The fourth embodiment shown in FIG. 4 is such that in the roller bearing assembly, in which the outer roller retainer 23 is made of a metallic material as is the case with that in the first embodiment, the outer roller retainer 23 has its opposite ends formed with radially inwardly extending collars 23$f$. Each of the collars 23f has an inner diameter smaller than the pitch circle diameter PCD. On the other hand, the inner roller retainer 13 is made of a synthetic resin and has radially outer edge portions 13e each tapered or be so shaped as to be arcuately rounded in section to represent an axially outwardly constricted edge portion.

Where the roller retainer 23 made of the metallic material is provided with the collars 23f as hereinbefore described, the strength of the roller retainer 23 can be further increased. Also, even where any interfering object is present in a side edge of the roller bearing assembly, the collars 23f displace such interfering object and, therefore, any trouble such as biting can be avoided.

Figure 5:
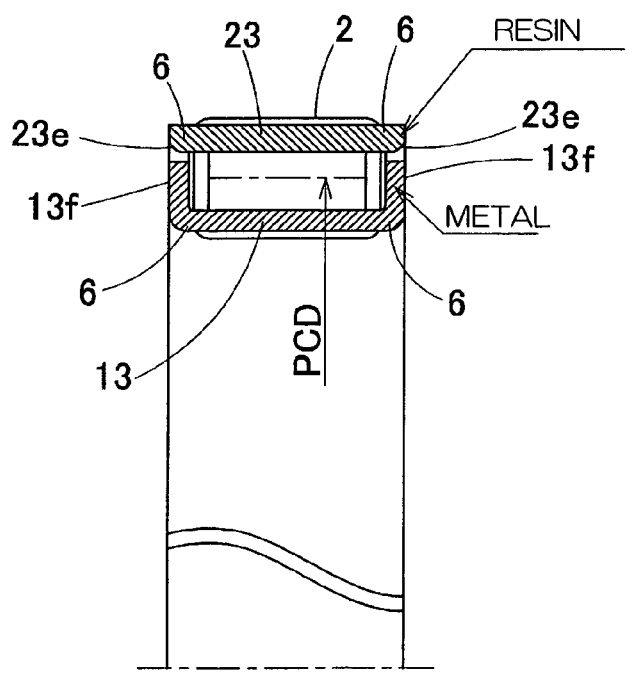
FIG. 5 is a fragmentary longitudinal sectional view of the roller bearing assembly according to a fifth preferred embodiment of the present invention.

The fifth embodiment shown in FIG. 5 is such that in the roller bearing assembly in which the inner roller retainer 13 is made of a metallic material in a manner reverse to that shown in and described with reference to FIG. 4, the inner roller retainer 13 is provided at its opposite ends with respective collars 13f. Each of those collars 13f has an inner diameter greater than the pitch circle diameter PCD. On the other hand, the outer roller retainer 23 is made of a synthetic resin and has radially inner edge portions 23e each tapered or be so shaped as to be arcuately rounded in section to represent an axially outwardly constricted edge portion.

Figure 6A:
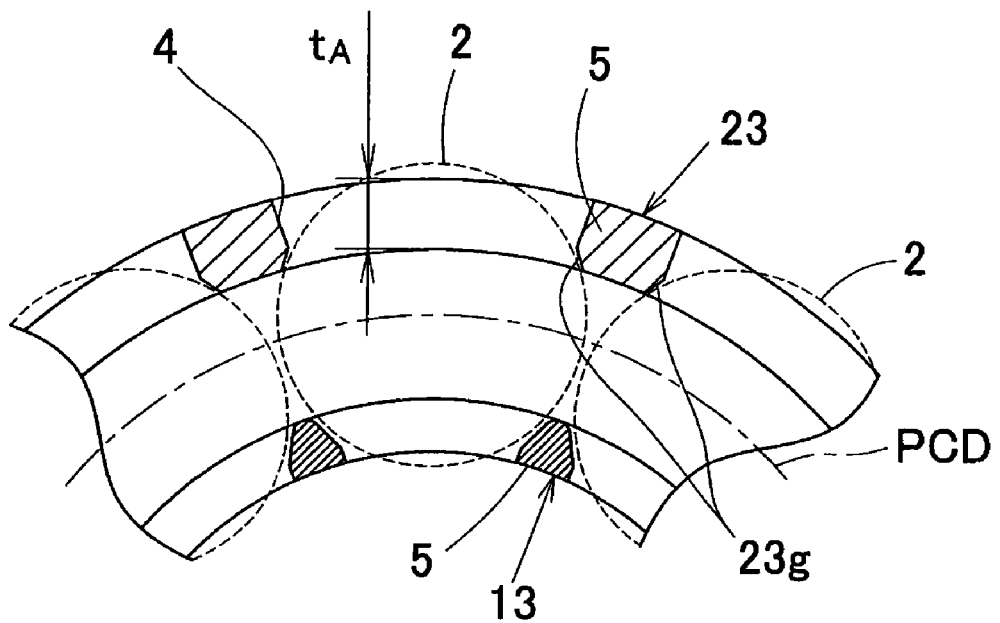
FIGS. 6A and 6B are fragmentary transverse sectional views showing, on an enlarged scale, the roller bearing assembly according to a sixth preferred embodiment of the present invention and a modified form thereof, respectively.
Figure 6B:
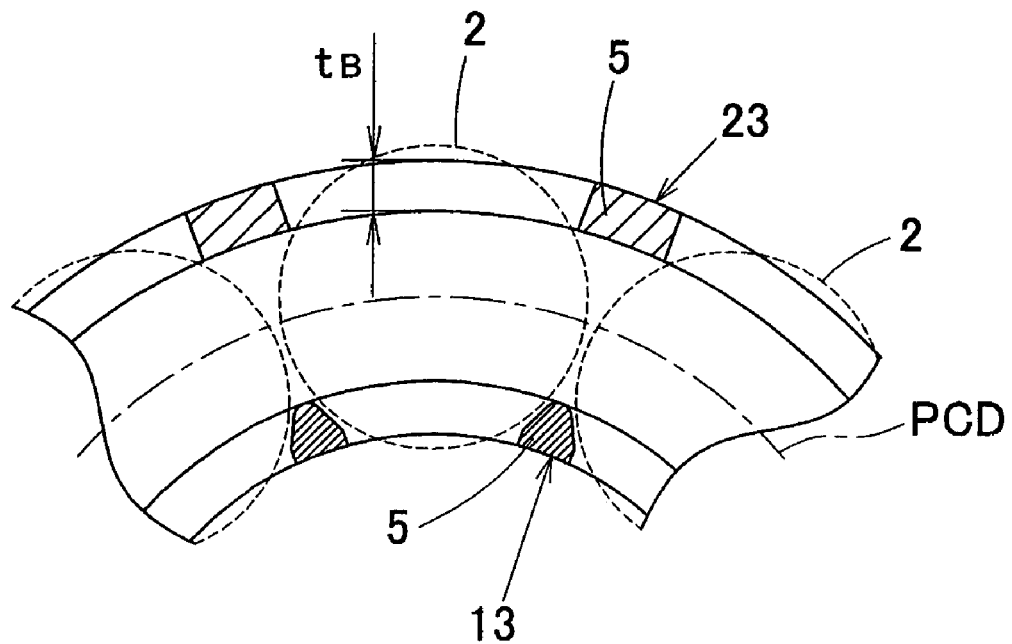
Figure 7A:
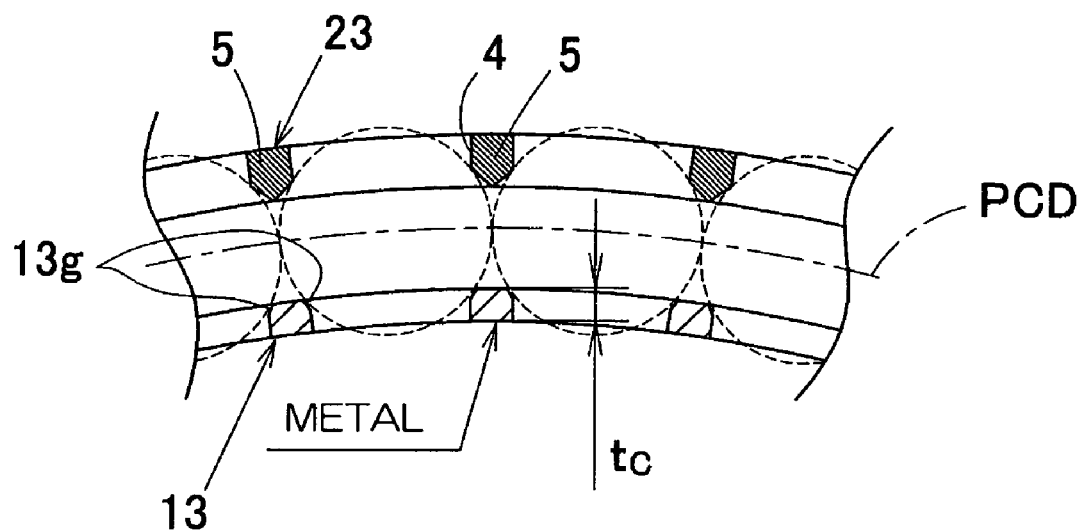
FIGS. 7A and 7B are fragmentary transverse sectional views showing, on an enlarged scale, the roller bearing assembly according to a seventh preferred embodiment of the present invention and a modified form thereof, respectively.
Figure 7B:
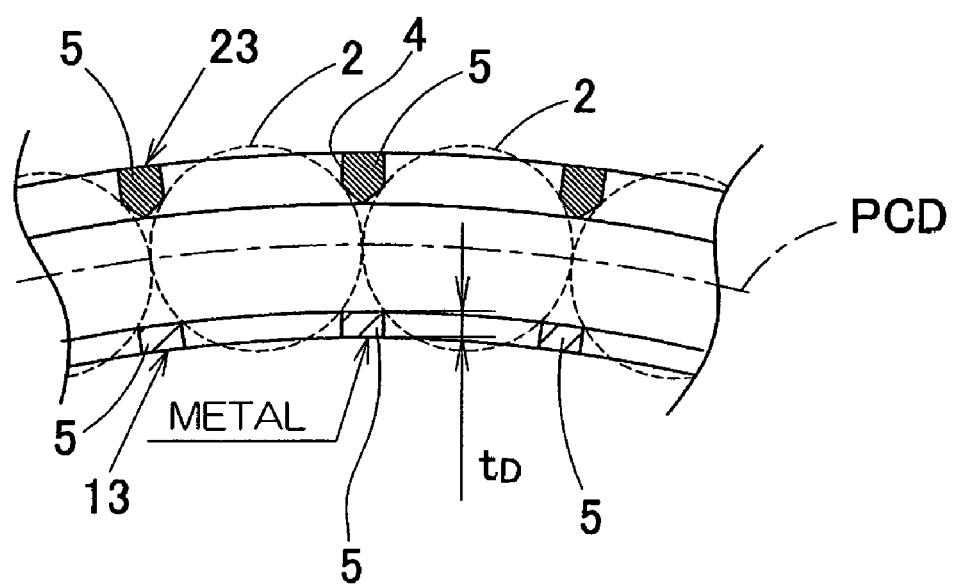

The sixth embodiment shown in FIG. 6A is such that in the first embodiment shown in and described with reference to FIG. 1, opposite corners of each of the pillars 5 of the outer roller retainer 23 made of a metallic material, which corners confront the neighboring rollers 2, are so shaped as to define plastically worked portions 23g of a chamfered shape, respectively. The plastic working is referred to as a surface-press or the like and is a process of hammering a corner with a flat metal die to form a flattened surface of a chamfered shape.

Where the opposite corners of each pillar 5, which confront the neighboring rollers 2, are so shaped as to represent a chamfered shape such as in this embodiment, the plate thickness $t_A$ of the roller retainer 23 can be increased. In other words, as can readily be understood from comparison with the plate thickness $t_B$ of the roller retainer (FIG. 6B) having no portion of such a chamfered shape, the plate thickness $t_A$ of the metallic roller retainer 23 in FIG. 6A can be increased by a quantity corresponding to the amount by which a recessed portion left by the chamfered shape can penetrate into the space between the rollers 2. For this reason, the strength of the roller retainer 23 can be increased. Also, since the process to form the chamfered shape is a plastic process, the roller retainer 23 can easily be processed as compared with a mechanical process such as, for example, a grinding process, and there is no problem of generation of grinding scraps.

Where the inner roller retainer 13 is made of a metallic material such as in the seventh embodiment shown in FIG. 7A, opposite corners of each of the pillars 5 of the inner roller retainer 13, which confront the neighboring rollers 2, may be so shaped as to define plastically worked portions 13g of a chamfered shape, respectively. Even in this case, the plate thickness $t_C$ of the inner roller retainer 13 can be increased to a relatively great value as compared with the plate thickness $t_D$ of the roller retainer having no chamfered shaped portion as shown in FIG. 7B.

Of the various embodiments hereinabove described, the embodiments in which the inner roller retainer 13 is made of the synthetic resin may have the sectional shape of each of the pillars 5 such as shown in any one of FIGS. 8A to 8C.

Figure 8A:
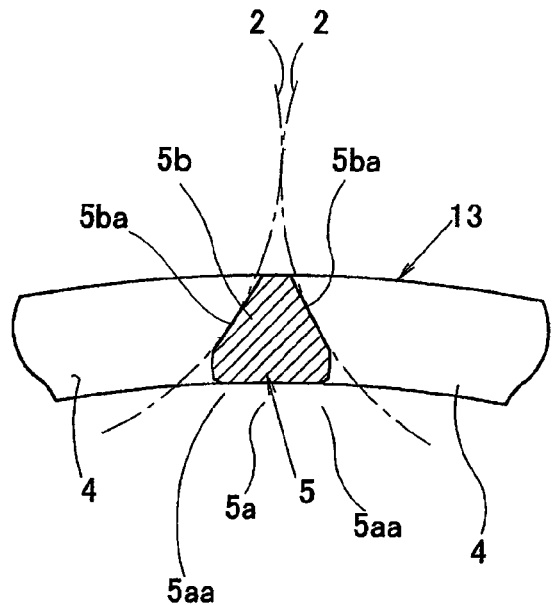
FIGS. 8A to 8C are fragmentary transverse sectional views showing, on an enlarged scale, various modifications of pillars of an inner retainer of the roller bearing assembly, respectively.

The cross-sectional shape of each pillar 5 shown in FIG. 8A is such that the radially innermost portion 5a has a substantially constant width and a portion 5b, positioned on one side radially outwardly of the radially innermost portion 5a, has a width progressively decreasing in a direction radially outwardly, terminating at a radially outermost tip that is, for example, squared or arcuately rounded in its entirety. Opposite side faces 5ba of the radially outer portion 5b represent, in its section, a rectilinear shape.

Figure 8B:
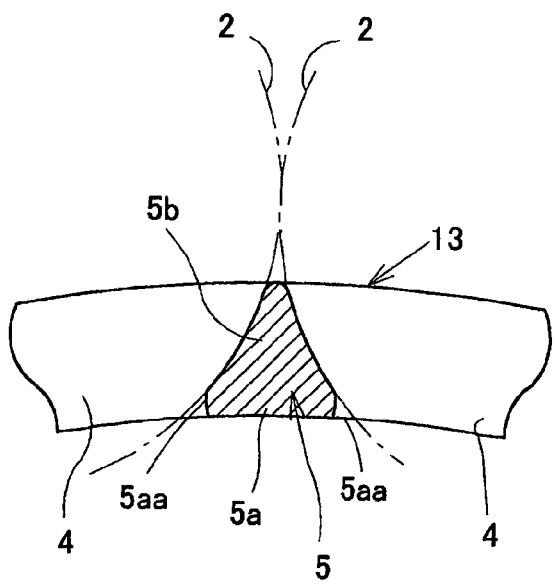
Figure 8C:
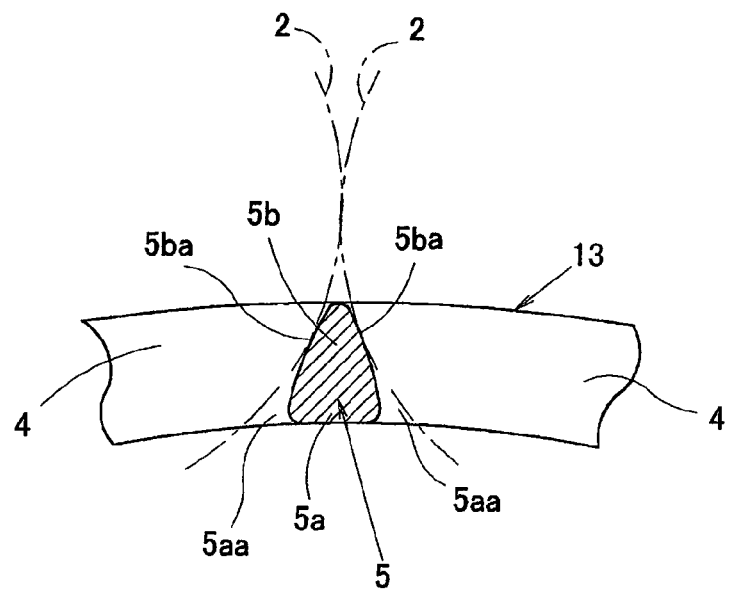

It is, however, to be noted that the opposite side faces 5ba of the radially outer portion 5b may represent a substantially curved shape following the curvature of an outer periphery of each of the rollers 2 as shown in FIG. 8B or a substantially convexed shape as shown in FIG. 8C.

It is also to be noted that the radially innermost portion 5a of each pillar 5 may not always have a substantially constant width in its sectional shape, but a radially intermediate portion of the radially innermost portion 5a, which have opposite side edges of an arcuately curved shape, may represent a shape most protruding in a circumferential direction or a shape having a pillar width constricted radially inwardly.

Figure 9:
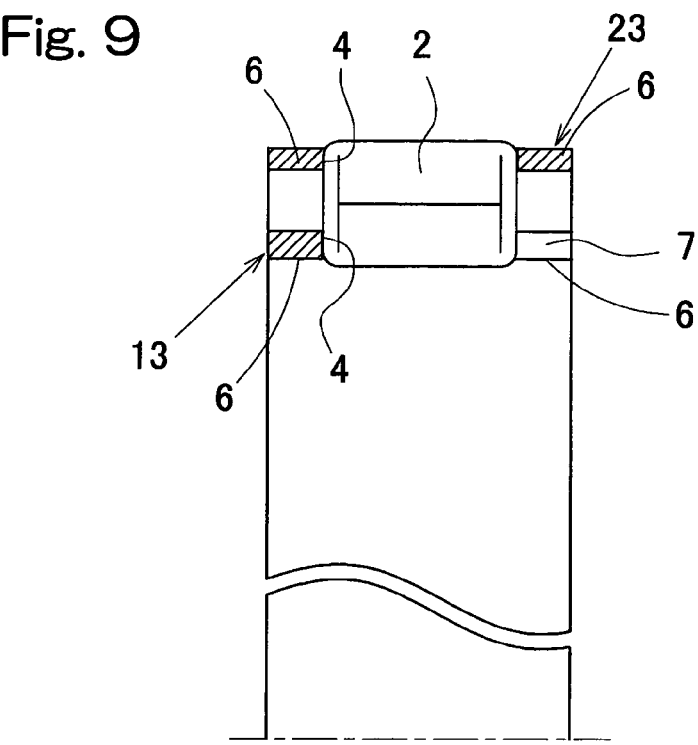
FIG. 9 is a fragmentary longitudinal sectional view of the roller bearing assembly according to a eighth preferred embodiment of the present invention.

FIG. 9 illustrates the eighth preferred embodiment of the present invention. The roller bearing assembly according to this embodiment is such that in the first embodiment shown in and described with reference to FIG. 1, a slit 7 of a shape, which is cut in from one side edge of the inner roller retainer 13 towards the opposite side edge thereof, are provided at a plurality of circumferential locations of the inner roller retainer 13 made of the synthetic resin.

Figure 10:
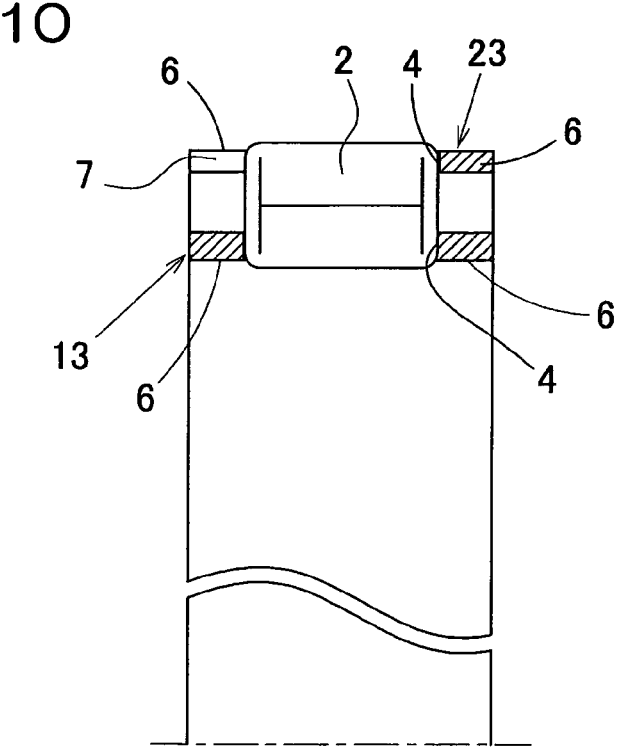
FIG. 10 is a fragmentary longitudinal sectional view of the roller bearing assembly according to a ninth preferred embodiment of the present invention.

The ninth embodiment shown in FIG. 10 is such that in the roller bearing assembly in which the inner roller retainer 13 is made of the metallic material in a manner reverse to that shown in and described with reference to FIG. 9, a slit 7 of a shape, which is cut in from one side edge of the outer roller retainer 23 towards the opposite side edge thereof, are provided at a plurality of circumferential locations of the outer roller retainer 23 that is made of the synthetic resin.

The shape of each of the slits 7 (7A) may be any one shown in FIGS. 11A to 11D. It is to be noted that those figures illustrate examples of the slit 7 in the inner roller retainer 13 of the structure shown and described in connection with the embodiment of FIG. 9, the various shapes shown in FIGS. 11A to 11D can be employed for the slit 7 in the outer roller retainer 23 shown in FIG. 10.

Specifically, FIG. 11A illustrates the roller retainer 13, in which the slits 7 are cut inwardly from one side edge (a left side edge).

FIG. 11B illustrates the roller retainer 13, in which a combination of the slits 7 cut inwardly from one side edge and the slits 7 cut inwardly from the opposite side edge are employed in an alternating relation to each other.

FIG. 11C illustrates the roller retainer 13, in which the slits 7 and 7A cut inwardly from one side edge, but in which two types of slits 7 and 7A are employed. Specifically, the slits 7 are comprised of a segment, in which a portion of the ring-shaped end 6 between the neighboring pillars 5 is depleted substantially completely, and a segment which concurrently serves as a pocket between the neighboring pillars 5. On the other hand, the slits 7A are comprised of a segment, in which a portion of the ring-shaped end 6 between the neighboring pillars 5 is depleted partially at a location 6a, and a segment which concurrently serves as a pocket between the neighboring pillars 5. The slits 7 and 7A are so formed in the roller retainer 13 as to alternate with each other in a direction circumferentially of the roller retainer 13.

FIG. 11D illustrates the roller retainer 13, in which the slits 7 cut inwardly from one side edge and the slits 7 cut inwardly from the opposite side edge are so arranged as to be alternately staggered with each other in a direction circumferentially of the roller retainer.

In any one of the examples shown in FIGS. 11A, 11B and 11D, the roller retainer 13 includes portions of the ring-shaped ends 6 each between the neighboring pillars 5 are depleted substantially completely, and the slits each concurrently serving as a pocket between the neighboring pillars 5.

Also, in each of those examples shown respectively in FIGS. 11A and 11B, the pockets 4 and the slits 7 are so formed as to alternate with each other with each of the pillars 5 positioned between the pocket 4 and the slit 7 concurrently serving as a pocket.

Furthermore, in the example shown in FIG. 11C, the slits 7A are disposed with a plurality of dedicated pockets 4 left between the neighboring slits 7A and accordingly, in addition to the pillars 5 formed between the pocket 4 and the slit 7 concurrently serving as a pocket, the pillars 5 are, although not shown, also formed between neighboring dedicated pockets 4. Even in the examples shown respectively in FIGS. 11A and 11B, the slits 7 may be disposed with a plurality of dedicated pockets 4 left between the neighboring slits 7.

Each of the pillars 5, whether it is positioned between the pocket 4 and the slit 7 or whether it is positioned between the neighboring dedicated pockets 4, may be of a shape similar to that described in connection with the first embodiment with particular reference to FIG. 1B.

Figure 12A:
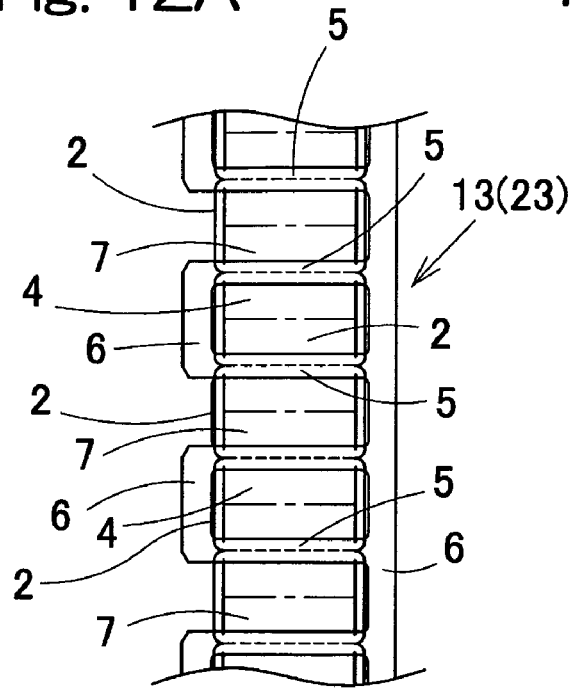
FIGS. 12A to 12C are fragmentary front elevational views showing different examples of arrangement of rollers in the roller retainer.
Figure 12B:
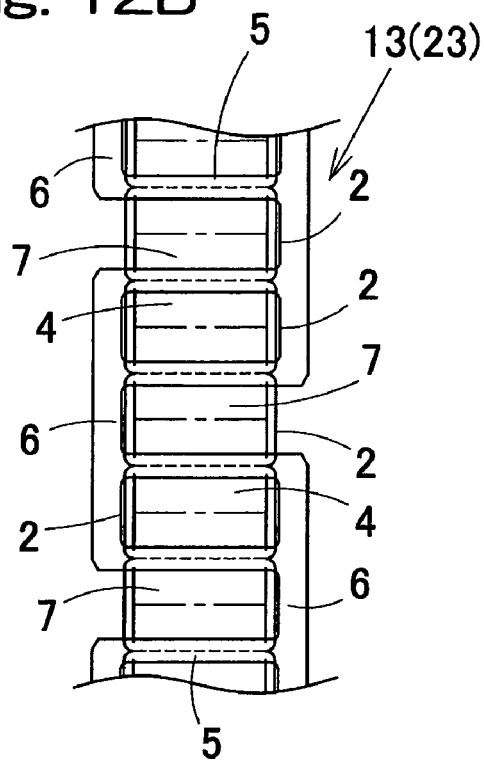
Figure 12C:
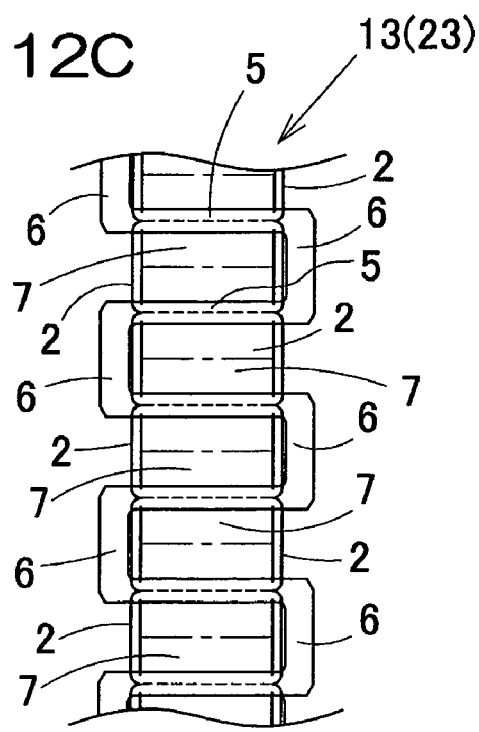

FIG. 12 illustrates conditions in which the rollers 2 are retained in the respective roller retainers 13 discussed above. In particular, FIG. 12A illustrates the roller retainer 13 (the example shown in FIG. 11A), in which the slits 7 are defined only on one side thereof, with the rollers 2 accommodated within not only the pockets 4, but also the slits 7. Thereby, it is possible to increase the load bearing capacity. FIG. 12B illustrates the roller retainer 13 (the example shown in FIG. 11B), in which the slits 7 are defined on both sides thereof, with the rollers 2 accommodated within not only the pockets 4, but also the slits 7. FIG. 12C illustrates the roller retainer 13 (the example shown in FIG. 11D), in which only the slits 7 are employed, with the rollers 2 accommodated within those slits 7.

According to the roller bearing assembly employing the roller retainer 13 (23) according to any one of the respective examples shown in FIGS. 11A-D, since the roller retainer 13 (23) are formed with the plural slits 7, 7A of a shape cut-in so as to extend from one side thereof to a position adjacent the opposite side thereof, during assemblage of the roller bearing assembly, insertion can readily be accomplished by setting open ends of the slits 7, 7A on a leading side of insertion and radially inwardly constricting such open ends. For this reason, the roller retainer 13 (23) can be deformed within the limit of elasticity possessed by the material for the roller retainer 13 (23) and, hence, not only the assemblability but also the precision can advantageously be increased while the flexure deformation of the roller retainer 13 (23) can be minimized, and the possible reduction of the precision, which would otherwise result from the deformation, can be avoided. It is to be noted that the inner roller retainer 13 is assembled by performing a diametric constriction while the outer roller retainer 23 is assembled by performing a diametric expansion.

Figure 13:
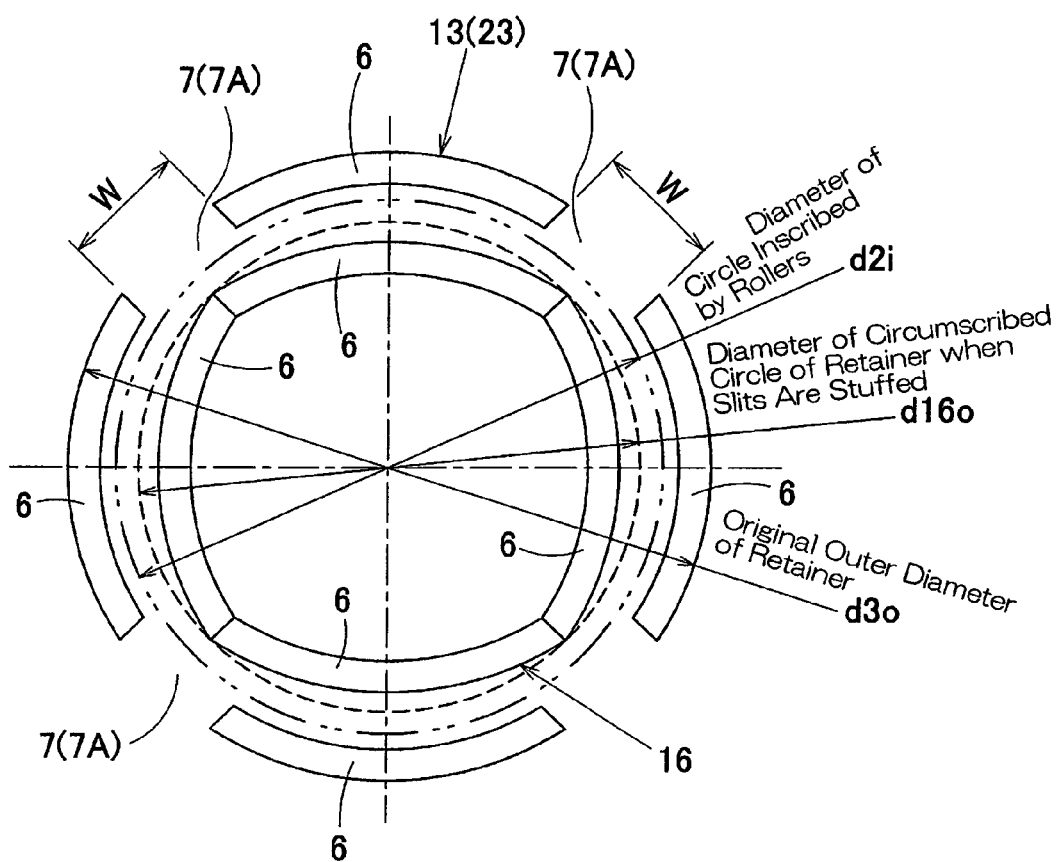
FIG. 13 is an explanatory diagram showing the roller retainers before and after constriction thereof, respectively.
Figure 14:
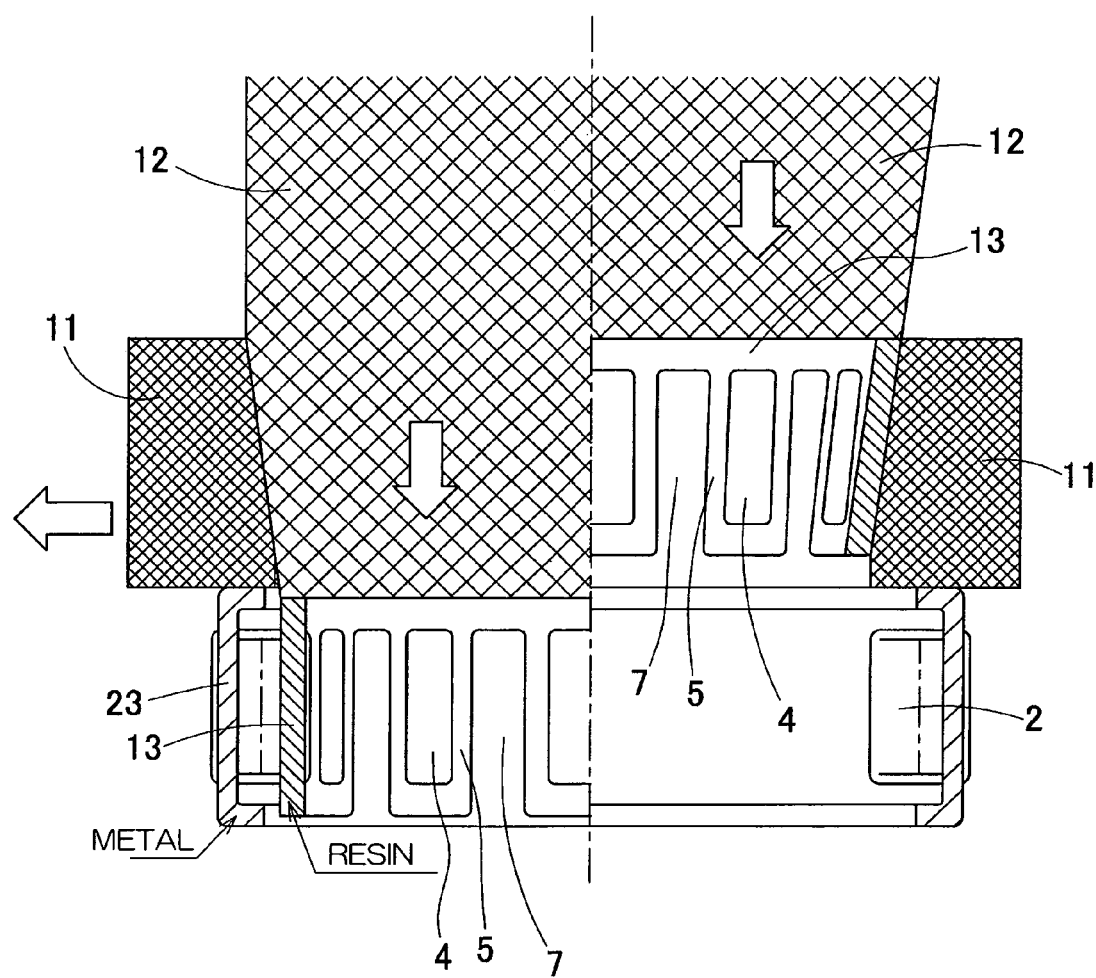
FIG. 14 is an explanatory diagram showing a first method of assembling the roller bearing assembly.
Figure 15:
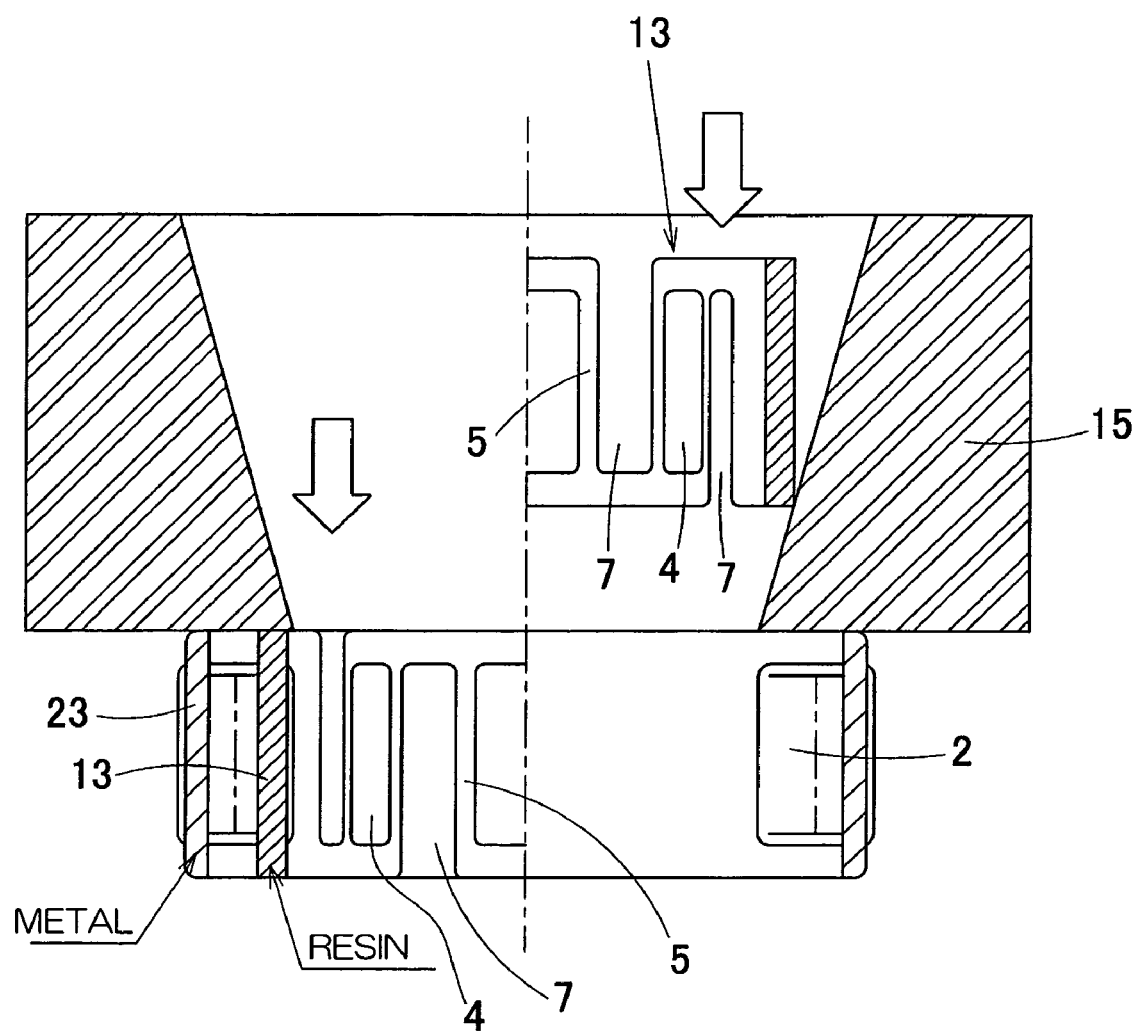
FIG. 15 is an explanatory diagram showing a second method of assembling the roller bearing assembly.

FIG. 13 illustrates an explanatory diagram showing, for comparison purpose, conditions before and after one side of the inner roller retainer 13, where the slits 7 (7A) are cut in, is subjected to a diametric constriction, respectively. As shown therein, the circumferential width W of each of the slits 7 (7A) and the number of the slits in the roller retainer 13 are so chosen that a ring body 16 (the ring-shaped end 6) assumed when arcuate circumferential portions, excluding the slits 7 (7A), are connected together, may have an outer diameter d16o smaller than the diameter d2i of the circle inscribed by the circular row of the rollers. In the case where the pockets 4 and the slits 7 are arranged in an alternating fashion with each other such as in the example shown in FIG. 11A or 11B, the dimensional relation between the outer diameter d16o and the diameter d2i of the inscribed circle can be easily satisfied, but in the case of the example shown in FIG. 11C and in the case where the number of the slits 7 formed is small or each slit 7 has a small opening width, it is preferred that the outer diameter d16o and the diameter d2i of the inscribed circle must be so chosen as to satisfy the foregoing dimensional relation.

Where the inner roller retainer 13 employs the slits 7 (7A), either a first assembling method shown in FIG. 14 or a second assembling method shown in FIG. 15, for example, can be employed.

The first assembling method shown in FIG. 14 is applicable to assemblage of the roller bearing assembly of a type in which the inner roller retainer 13 has the slits 7 (7A) only at one side thereof as shown in, for example, FIGS. 11A and 11C. According to this first assembling method, after the rollers 2 have been arranged in the inner periphery of the outer roller retainer 23, the inner roller retainer 13 is inserted axially inwardly of the circular row of the rollers with the open ends of the slits 7 (7A) oriented inwardly of the circular row of the rollers. This job of inserting the inner roller retainer 13 is carried out by pushing the inner roller retainer 13 axially inwardly of the row of the rollers by means of a pushing jig 12 while the leading side of the inner roller retainer 13 is radially inwardly constricted with the use of an alternatively constrictable and expandable jig 11 having an inner surface representing a conical shape. This movable jig 11 referred to above may be of a type including a plurality of splitjig segments arranged in a circumferential direction. An example of the movable jig 11 includes a collet chuck or the like. The movable jig. 11 expands radially as the pushing jig 12 moves into the movable jig 11. After the insertion of the inner roller retainer 13, the roller retainer 13 is allowed to restore to the original shape by the effect of the elasticity possessed by the material for the roller retainer 13. In this way, the rollers 2 can be inserted in part within the pockets 4 of the roller retainer 13.

When the roller bearing assembly is assembled in the manner described above, the roller retainer 13 can be deformed by the utilization of the elasticity possessed by the material used to form the roller retainer 13 and, therefore, the bending or flexure deformation of the roller bearing 13 can be minimized to thereby prevent the precision of the roller bearing 13 from being reduced, resulting in increase of the assemblability and the prevision. Also, assemblage can be automated.

The second assembling method shown in FIG. 15 is applicable to the roller bearing assembly, in which the inner roller retainer 13 has the slits 7 on its opposite sides, for example, the roller bearing 13 of the type shown in FIG. 11B. Even in this second assembling method, after the rollers 2 have been arranged in the inner periphery of the outer roller retainer 23, the inner roller retainer 13 is inserted axially inwardly of the circular row of the rollers 2. However, this job of inserting the inner roller retainer 13 is carried out by pushing the inner roller retainer into a stationary guide jig 15 of a type, having an inner peripheral surface representing a conical shape, to diametrically constrict the leading side of the inner roller retainer 13. After the insertion of the inner roller retainer 13, the roller retainer 13 is allowed to restore to the original shape by the effect of the elasticity possessed by the material for the roller retainer 13. In this way, the rollers 2 can be inserted in part within the pockets 4 of the roller retainer 13.

As described above, where the roller retainer 13 of the type in which the slits 7 are arranged in echelon in the circumferential direction thereof, the roller bearing assembly can readily be assembled merely by pushing the roller retainer 13 into the guide jig 15, with no need to use any chuck (the alternatively constrictable and expandable jig). Even in this case, a flexure deformation of the roller retainer 13 can advantageously be minimized and an undesirable reduction in precision brought about by the deformation can advantageously be prevented, thereby increasing the assemblability and the precision. Also, since the roller retainer 13 has the slits 7 on both sides thereof, the roller retainer 13 need not be oriented in a particular direction during the insertion, allowing the assemblability to be further increased. In addition, the assemblage discussed above can be automated with a simplified structure.

It is to be noted that FIGS. 14 and 15 illustrates the different assembling methods which have been described as applicable to the inner roller retainer 13 having the slits 7, they can be equally applied to the outer roller retainer 23 in a manner similar to those applied to the inner roller retainer 13, noting that the outer roller retainer is reverse in position to the inner roller retainer.

Figure 16:
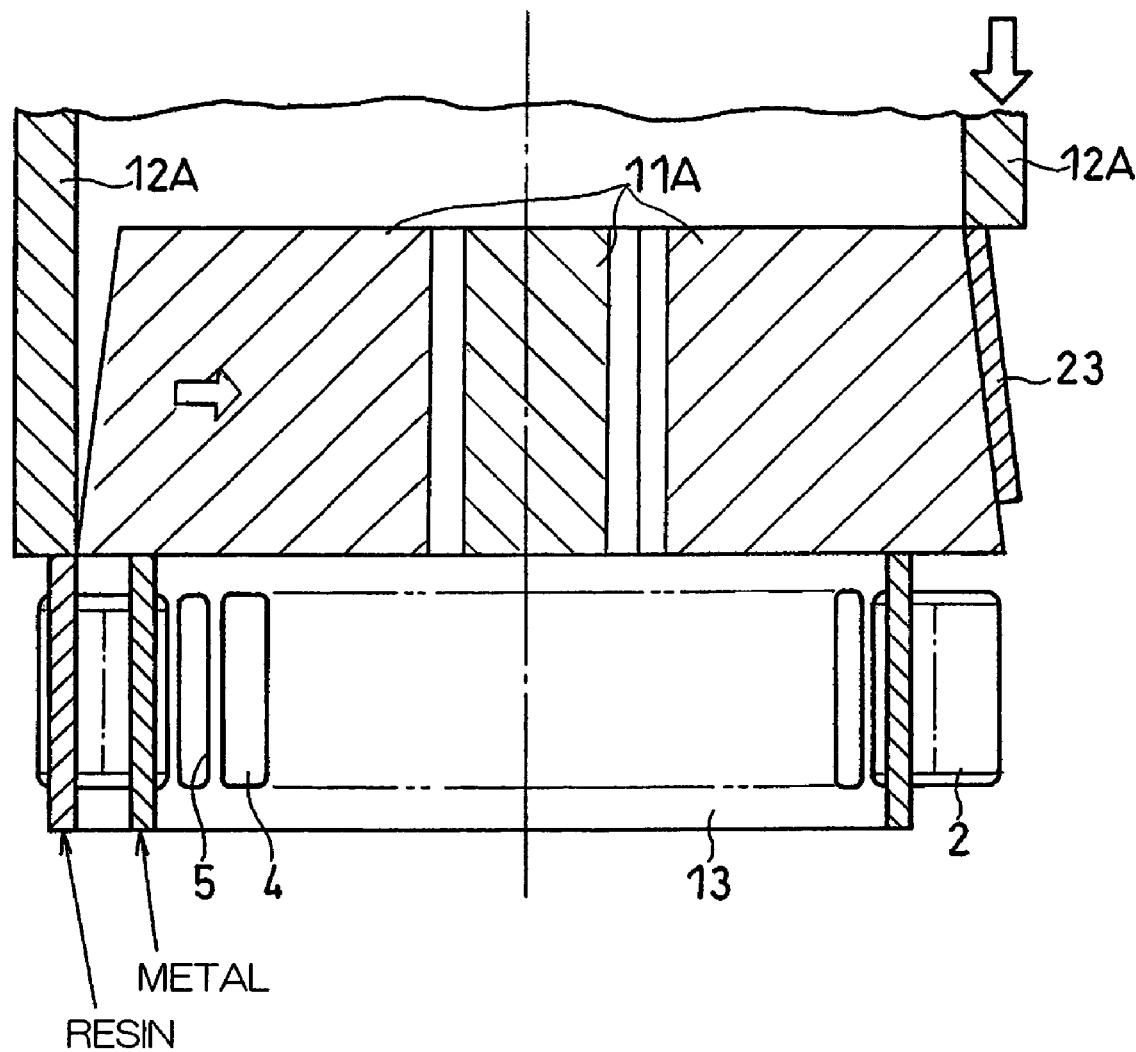
FIG. 16 is an explanatory diagram showing a third method of assembling the roller bearing assembly.
Figure 17:
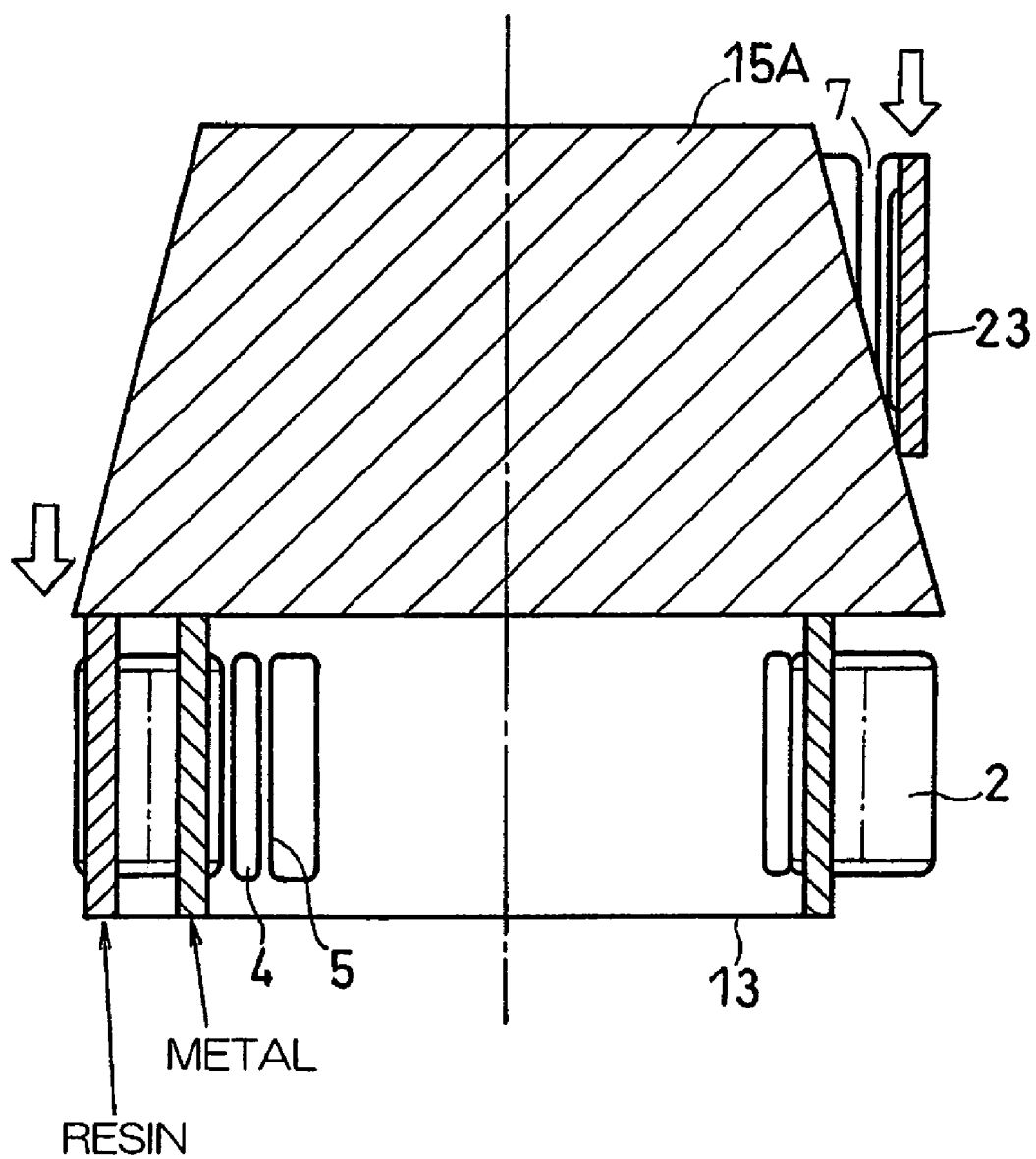
FIG. 17 is an explanatory diagram showing a fourth method of assembling the roller bearing assembly.

By way of example, a third assembling method is applicable to the roller bearing assembly in which the outer roller retainer 23 has the slits 7 only on one side such as shown in FIGS. 10, 11A and 11C. In such case, as shown in FIG. 16, after the rollers 2 have been arranged in the outer periphery of the inner roller retainer 13, the outer roller retainer 23 is inserted axially outwardly of the circular row of the rollers 2. This job of inserting the outer roller retainer 23 is carried out by pushing the outer roller retainer 23 axially outwardly of the row of the rollers 2 by means of a pushing jig 12A, positioned radially outwardly thereof, while the leading side of the outer roller retainer 23 is radially outwardly expanded with the use of a constrictable and expandable jig 11A having an outer peripheral surface representing a conical shape, which is in contrast to the alternatively constrictable and expandable jig 11 having an inner peripheral surface representing a conical shape shown in FIG. 14. After the insertion of the outer roller retainer 23 in FIG. 16, the roller retainer 23 is allowed to restore to the original shape by the effect of the elasticity possessed by the material for the roller retainer 23.

A fourth assembling method is applicable to the roller bearing assembly, in which the outer roller retainer 23 has the slits 7 on its opposite sides, for example, the roller bearing 23 of the type shown in FIGS. 10 and 11B. Even in this fourth assembling method, after the rollers 2 have been arranged in the outer periphery of the inner roller retainer 13, the outer roller retainer 23 is inserted axially outwardly of the circular row of the rollers 2. This job of inserting the outer roller retainer 23 is carried out in a manner substantially reverse to that for the roller retainer 13 in the example shown in FIG. 15, i.e., by pushing the outer roller retainer 23 into a guide jig 15A having an outer peripheral surface representing a conical shape, to diametrically expand the outer roller retainer 23. After the insertion of the outer roller retainer 23, the roller retainer 23 is allowed to restore to the original shape by the effect of the elasticity possessed by the material for the roller retainer 23.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A roller bearing assembly comprising:
    a ring-shaped inner roller retainer including opposite ring-shaped ends and pillars extending between the opposite ring-shaped ends and spaced from each other in a direction circumferentially thereof, the neighboring pillars defining a plurality of pockets therebetween;
    a ring-shaped outer roller retainer, radially separate from the inner roller retainer, including opposite ring-shaped ends and pillars extending between the opposite ring-shaped ends and spaced from each other in a direction circumferentially thereof, the neighboring pillars defining a plurality of pockets therebetween; and
    a corresponding number of rollers rollingly retained in part within the pockets of the inner roller retainer and in part within the pockets of the outer roller retainer;
    wherein the pillars of the inner roller retainer retain the rollers from radially inwardly and a circular array of the pillars of the inner roller retainer has an outer diameter smaller than a diameter of a pitch circle of the rollers;
    wherein the pillars of the outer roller retainer retain the rollers from radially outwardly and a circular array of the pillars of the outer roller retainer has an inner diameter greater than the diameter of the pitch circle of the rollers; and
    wherein one of the inner and outer roller retainers is made of a metallic material and the other of the inner and outer roller retainers is made of a resinous material.

2. The roller bearing assembly as claimed in claim 1, further comprising a slit of a shape cut-in from one side edge of the roller retainer made of the resinous material towards the opposite side edge is provided at a plurality of circumferential locations of the roller retainer made of the resinous material.

3. The roller bearing assembly as claimed in claim 2, wherein the slit concurrently serves as a pocket for receiving the corresponding roller.

4. The roller bearing assembly as claimed in claim 2, wherein the slit is provided only in an end face at one side of the roller retainer.

5. A method of assembling the roller bearing assembly as defined in claim 4, in which an inner roller retainer has slits provided only on one side thereof, the method comprising:
    arranging rollers on an inner peripheral surface of an outer roller retainer;
    subsequently inserting an inner roller retainer axially inwardly of a circular row of the rollers; and
    after the insertion, allowing the inner roller retainer to restore to an original diameter by means of an elasticity possessed by a material for the inner roller retainer;
    wherein the insertion of the inner roller retainer is carried out by pushing the inner roller retainer axially inwardly of the row of the rollers by means of a pushing jig while a leading side of the inner roller retainer is radially inwardly constricted with use of an alternatively constrictable and expandable jig having an inner surface representing a conical shape.

6. A method of assembling the roller bearing assembly as defined in claim 4, in which an outer roller retainer has slits provided only on one side thereof, the method comprising:
    arranging rollers on an outer peripheral surface of an inner roller retainer;
    subsequently inserting an outer roller retainer axially outwardly of a circular row of the rollers; and after the insertion, allowing the outer roller retainer to restore to an original diameter by means of an elasticity possessed by a material for the outer roller retainer;

wherein the insertion of the outer roller retainer is carried out by pushing the outer roller retainer axially outwardly of the row of the rollers by means of a pushing jig while a leading side of the outer roller retainer is radially outwardly expanded with use of an alternatively constrictable and expandable jig having an outer surface representing a conical shape.

7. The roller bearing assembly as claimed in claim 2, wherein respective positions of the slits are equidistantly or non-equidistantly spaced from each other.

8. The roller bearing assembly as claimed in claim 2, wherein the slit is provided in end faces on opposite sides of the roller retainer.

9. The roller bearing assembly as claimed in claim 8, wherein respective positions of the slits are equidistantly or non-equidistantly spaced from each other and the slits in the end faces on the opposite sides of the roller retainer are alternately or non-alternately arranged relative to each other.

10. A method of assembling the roller bearing assembly as defined in claim 8, in which an inner roller retainer has slits provided on both sides thereof, the method comprising:

arranging rollers on an inner peripheral surface of an outer roller retainer;

subsequently inserting an inner roller retainer axially inwardly of a circular row of the rollers; and after the insertion, allowing the inner roller retainer to restore to an original diameter by means of an elasticity possessed by a material for the inner roller retainer;

wherein the insertion of the inner roller retainer is carried out by pushing the inner roller retainer into a guide jig having an inner peripheral surface representing a conical shape, to radially inwardly constrict a diameter of the inner roller retainer.

11. A method of assembling the roller bearing assembly as defined in claim 8, in which an outer roller retainer has slits provided on both sides thereof, the method comprising:

arranging rollers on an outer peripheral surface of an inner roller retainer;

subsequently inserting an outer roller retainer axially outwardly of a circular row of the rollers; and after the insertion, allowing the outer roller retainer to restore to an original diameter by means of an elasticity possessed by a material for the outer roller retainer;

wherein the insertion of the outer roller retainer is carried out by pushing the outer roller retainer into a guide jig having an outer peripheral surface representing a conical shape, to radially outwardly expand a diameter of the outer roller retainer.

12. The roller bearing assembly as claimed in claim 2, wherein a circumferential width of each of the slits and a number of the slits in the roller retainer are so chosen that a ring body assumed when arcuate circumferential portions, excluding the slits, are connected together, may have an outer diameter that is smaller than a diameter of a circle inscribed by a circular row of the rollers.

13. The roller bearing assembly as claimed in claim 1, wherein a radially outer or inner edge portion of the roller retainer made of the resinous material is tapered axially outwardly or so shaped as to represent an axially outwardly constricted edge portion.

14. The roller bearing assembly as claimed in claim 1, wherein each of the pillars of the inner roller retainer has a cross-sectional shape having a radially outer portion thereof constricted in a direction radially outwardly thereof.

15. The roller bearing assembly as claimed in claim 1, wherein each of the pillars of the outer roller retainer has a rectangular cross-sectional shape or a shape having a radially inner portion thereof constricted in a direction radially inwardly thereof.

16. The roller bearing assembly as claimed in claim 1, wherein the inner roller retainer has an inner diameter greater by 0.1 mm or more than a diameter of an inscribed circle of a circular row of the rollers.

17. The roller bearing assembly as claimed in claim 1, wherein the outer roller retainer has an outer diameter smaller by 0.1 mm or more than a diameter of a circumscribed circle of a circular row of the rollers.

18. The roller bearing assembly as claimed in claim 1, wherein the roller retainer made of the metallic material is formed by curling a metal strip in a ring shape with its opposite ends welded together.

19. The roller bearing assembly as claimed in claim 1, wherein the roller retainer made of the metallic material is manufactured by means of a grinding process.

20. The roller bearing assembly as claimed in claim 1, wherein the roller retainer made of the metallic material is manufactured by means of a press work.

21. The roller bearing assembly as claimed in claim 1, wherein respective corners of the pillars of the roller retainer made of the metallic material are provided with plastically worked portions of a chamfered shape.

22. The roller bearing assembly as claimed in claim 1, wherein the roller retainer made of the resinous material is formed by means of an injection molding process.

23. The roller bearing assembly as claimed in claim 1, wherein the roller retainer made of the resinous material is manufactured by means of a grinding process.

24. The roller bearing assembly as claimed in claim 1, wherein the corresponding number of rollers is equal to or smaller by one or two than a number of rollers used in a full complement type roller assembly.

25. The roller bearing assembly as claimed in claim 1, wherein each of the inner roller retainer and outer roller retainer is a ring-shaped unitary member having no opposite ends in a circumferential direction.

\* \* \* \* \*